（12） United States Patent
Yoshida et al.

(10) Patent No.: US 8,890,851 B2
(45) Date of Patent: Nov. 18, 2014

(54) OPTICAL POSITION DETECTION DEVICE AND DISPLAY SYSTEM WITH INPUT FUNCTION

(75) Inventors: Kazuki Yoshida, Suwa (JP); Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 175 days.

(21) Appl. No.: 13/491,895

(22) Filed: Jun. 8, 2012

(65) Prior Publication Data

US 2013/0016068 A1     Jan. 17, 2013

(30) Foreign Application Priority Data

Jul. 15, 2011   (JP) .................................. 2011-156432

(51) Int. Cl.
*G06F 3/042*   (2006.01)
(52) U.S. Cl.
CPC .................................... *G06F 3/0428* (2013.01)
USPC .......................................................... 345/176
(58) Field of Classification Search
CPC ...... G06F 3/0414; G06F 3/016; G06F 3/0338
USPC .................................. 345/175, 157
See application file for complete search history.

(56) References Cited

U.S. PATENT DOCUMENTS

| 6,953,926 | B2 | 10/2005 | Reime |  |
| 2009/0058833 | A1* | 3/2009 | Newton | .......................... 345/175 |
| 2011/0084903 | A1* | 4/2011 | Onishi | ........................... 345/157 |
| 2011/0096032 | A1* | 4/2011 | Nakanishi | ...................... 345/175 |
| 2011/0102374 | A1* | 5/2011 | Wassvik et al. | ................ 345/175 |
| 2011/0216041 | A1* | 9/2011 | Cho et al. | ........................ 345/175 |
| 2011/0279361 | A1 | 11/2011 | Onishi |  |
| 2011/0279827 | A1 | 11/2011 | Onishi |  |
| 2011/0304591 | A1* | 12/2011 | Takahashi et al. | ............. 345/175 |

FOREIGN PATENT DOCUMENTS

| JP | 2003-534554 | 11/2003 |
| JP | 2009-295318 | 12/2009 |
| JP | 2010-127671 | 6/2010 |
| JP | 2011-237360 | 11/2011 |
| JP | 2011-237361 | 11/2011 |

* cited by examiner

*Primary Examiner* — Dwayne Bost
*Assistant Examiner* — Chineyere Wills-Burns
(74) *Attorney, Agent, or Firm* — Harness, Dickey & Pierce, P.L.C.

(57) ABSTRACT

A detection target space of an optical position detection device is divided into a detection target space due to a light emitting/receiving unit and a light emitting/receiving unit and a detection target space due to a light emitting/receiving unit and a light emitting/receiving unit. The light emitting/receiving units overlap each other in a Z-axis direction, and a light receiving element of the light emitting/receiving unit and a light receiving element of the light emitting/receiving unit are disposed so as to overlap each other in the Z-axis direction with light receiving surfaces facing to respective directions different from each other.

8 Claims, 16 Drawing Sheets

OPTICAL POSITION DETECTION DEVICE AND DISPLAY SYSTEM WITH INPUT FUNCTION

BACKGROUND

1. Technical Field

The present invention relates to an optical position detection device for optically detecting a position of a target object, and a display system with an input function provided with the optical position detection device.

2. Related Art

As the optical position detection device for optically detecting the target object, there is proposed, for example, a device (see, e.g., JP-T-2003-534554 (Patent Document 1) in which detection lights are emitted respectively from a plurality of point light sources toward the target object via a light transmissive member, and then the detection lights reflected by the target object are transmitted through the light transmissive member, and then detected by a light receiving element. Further, there are also proposed optical position detection devices using a method of emitting the detection lights, which are emitted respectively from the plurality of point light sources, via a light guide plate, and then detecting the detection lights reflected by the target object with the light receiving element (see JP-A-2010-127671 (Patent Document 2) and JP-A-2009-295318 (Patent Document 3)).

In such optical position detection devices, the position of the target object is detected based on a result of comparison between a light reception intensity in the light receiving element when lighting some of the plurality of point light sources and a light reception intensity in the light receiving element when lighting some other of the plurality of point light sources.

However, in the optical position detection devices described in Patent Documents 1 through 3, there is a problem that a range in which the position of the target object can be detected is narrow. Specifically, in the optical position detection device described in Patent Document 1, the detection light emitted from the point light source is used. Therefore, since an emission angular range itself of the detection light is narrow, the range in which the position of the target object can be detected is narrow. Further, in the optical position detection devices described in Patent Documents 2 and 3, although the detection light emitted from the point light source is emitted via the light guide plate, and therefore the detection light can be emitted throughout a relatively wide range, attenuation of the detection light while propagating inside the light guide plate is inevitable. Therefore, since it is difficult to form a predetermined light intensity distribution with a sufficient intensity level throughout a wide range, the range in which the position of the target object can be detected is narrow.

SUMMARY

Inventors of the invention have considered expanding a detection target space by adopting a method of radially emitting the detection light from a light source section along an imaginary plane, and then detecting the light reflected by the target object using the light receiving element. However, in the case of such a method, light enters the light receiving element in a wide angular range, and if the light receiving element has directivity in sensitivity with which the sensitivity varies with an incident angle, there arises a problem that detection accuracy is degraded if the target object is located in an angular direction with low sensitivity.

An advantage of some aspects of the invention is to provide an optical position detection device capable of detecting a position of a target object with high accuracy throughout a wide range, and a display system with an input function equipped with the optical position detection device.

An aspect of the invention is directed to an optical position detection device including a light source section adapted to radially emit detection light along an imaginary plane defined by a first direction and a second direction perpendicular to each other, a light receiving element disposed at a position overlapping a radiation center of the detection light when viewed from a third direction perpendicular to the imaginary plane, and adapted to receive the detection light reflected by a target object, and a position detection section adapted to detect a position of the target object based on a light reception intensity in the light receiving element, wherein the light receiving element includes a first light receiving element, and a second light receiving element disposed on one side in the third direction with respect to the first light receiving element, overlapping the first light receiving element when viewed from the third direction, and having a light receiving surface a normal direction of which is different from a normal direction of a light receiving surface in the first light receiving element in an in-plane direction of the imaginary plane.

According to this aspect of the invention, since the detection light is radially emitted from the light source section along the imaginary plane, the detection light can be emitted with relatively high intensity throughout a broad range. Further, in the aspect of the invention, since the first light receiving element and the second light receiving element having the respective normal directions with respect to the light receiving surfaces different from each other are provided as the light receiving element, high light reception sensitivity is obtained throughout a wide angular range. Therefore, it is possible to optically detect the position of the target object with high accuracy throughout a broad range. Here, the first light receiving element and the second light receiving element are disposed at positions shifted in the third direction from each other so as to overlap each other when viewed from the third direction. Therefore, even if the first light receiving element and the second light receiving element are disposed at respective positions close to each other, a light reception angular range of the first light receiving element and a light reception angular range of the second light receiving element can partially be overlapped with each other when viewed from the third direction, and therefore, no blind area occurs in the light reception angular range. Therefore, even in the case of broadening a detection target space, the position of the target object can optically be detected with high accuracy throughout the entire detection target space. The optical position detection device of the aspect of the invention may be configured such that the light source section includes a first light source section having an angular range, which at least partially overlaps the light reception angular range of the first light receiving element, as a detection light emission angular range, and a second light source section having an angular range, which at least partially overlaps the light reception angular range of the second light receiving element, as the detection light emission angular range, and a radiation center of the detection light emitted from the first light source section and a radiation center of the detection light emitted from the second light source section overlap each other when viewed from the third direction.

In this configuration, it is preferable that the first light source section and the second light source section are disposed at respective positions different in the third direction from each other. According to this configuration, since the emission angular range of the first light source section and the emission angular range of the second light source section can partially be overlapped with each other when viewed from the third direction, no blind area occurs in the emission angular range. Therefore, even in the case of broadening the detection target space, the position of the target object can optically be detected with high accuracy throughout the entire detection target space.

The optical position detection device of the aspect of the invention may be configured such that the first light receiving element and the first light source section constitute a first light emitting/receiving unit, and the second light receiving element and the second light source section constitute a second light emitting/receiving unit. In this configuration, it is preferable that the light source section further includes a third light source section adapted to radially emit the detection light to an angular range at least partially overlapping the detection light emission angular range of the first light source section, and a fourth light source section adapted to radially emit the detection light to an angular range at least partially overlapping the detection light emission angular range of the second light source section, the light receiving element further includes a third light receiving element having an angular range at least partially overlapping a detection light emission angular range of the third light source section as a light reception angular range, and overlapping a radiation center of the detection light emitted from the third light source section when viewed from the third direction, and a fourth light receiving element having an angular range at least partially overlapping a detection light emission angular range of the fourth light source section as a light reception angular range, and overlapping a radiation center of the detection light emitted from the fourth light source section when viewed from the third direction, the third light receiving element and the third light source section constitute a third light emitting/receiving unit at a position distant from the first light emitting/receiving unit on one side of the second direction, the fourth light receiving element and the fourth light source section constitute a fourth light emitting/receiving unit at a position distant from the third light emitting/receiving unit on one side of the first direction, and the first light emitting/receiving unit and the second light emitting/receiving unit are disposed at a position, which is on a perpendicular bisector with respect to an imaginary line segment extending in the first direction so as to connect the third light emitting/receiving unit and the fourth light emitting/receiving unit, and is distant from the line segment on the other side of the second direction. According to this configuration, the broad detection target space can be realized only by making the detection target spaces formed by the respective light emitting/receiving units continuous to each other. In other words, the broad detection target space can be divided into the detection target space formed by one pair of light emitting/receiving units (the first light emitting/receiving unit and the third light emitting/receiving unit) and the detection target space formed by the other pair of light emitting/receiving units (the second light emitting/receiving unit and the fourth light emitting/receiving unit). Therefore, although the detection target space is broad, the entire detection target space can be irradiated with the detection light with a sufficient intensity. Further, since the detection target space is divided, and each of the light receiving elements is only required to handle a relatively narrow angular range, it is enough for the light receiving element to receive the detection light entering in the angular range with relatively high sensitivity. Therefore, even in the case of the broad detection target space, position detection accuracy of the target object is kept high. Further, the third light emitting/receiving unit and the fourth light emitting/receiving unit are distant from each other in the first direction, and the first light emitting/receiving unit and the second light emitting/receiving unit are disposed on the perpendicular bisector with respect to the imaginary line segment connecting the third light emitting/receiving unit and the fourth light emitting/receiving unit at the position distant from the line segment on the other side of the second direction. Therefore, even in the casein which the four light emitting/receiving units (the first light emitting/receiving unit, the second light emitting/receiving unit, the third light emitting/receiving unit, and the fourth light emitting/receiving unit) are arranged at positions relatively close to each other, when emitting the detection light from the third light emitting/receiving unit and the fourth light emitting/receiving unit on the other side of the second direction, the detection light is difficult to be blocked by the first light emitting/receiving unit and the second light emitting/receiving unit.

In the optical position detection device of the aspect of the invention, it is preferable that in the in-plane direction of the imaginary plane, each angle formed between a normal direction with respect to a light receiving surface of the first light receiving element and the perpendicular bisector, an angle formed between the normal direction with respect to the light receiving surface of the second light receiving element and the perpendicular bisector, an angle formed between a normal direction with respect to a light receiving surface of the third light receiving element and the perpendicular bisector, and an angle formed between a normal direction with respect to a light receiving surface of the fourth light receiving element and the perpendicular bisector is equal to or smaller than 60°. If a typical photodiode is used for the light receiving element, a half-value angle thereof is generally 60°. Therefore, since the light receiving element is only required to detect the detection light entering in the angular range within the half-value angle with relatively high sensitivity, the high position detection accuracy of the target object can be obtained.

In the optical position detection device of the aspect of the invention, it is preferable that in the in-plane direction of the imaginary plane, the angle formed between the normal direction with respect to the light receiving surface of the third light receiving element and the perpendicular bisector is equal to or smaller than the angle formed between the normal direction with respect to the light receiving surface of the first light receiving element and the perpendicular bisector, and the angle formed between the normal direction with respect to the light receiving surface of the fourth light receiving element and the perpendicular bisector is equal to or smaller than the angle formed between the normal direction with respect to the light receiving surface of the second light receiving element and the perpendicular bisector. According to this configuration, even in the case in which a detection target angular range handled by the third light emitting/receiving unit and the fourth light emitting/receiving unit is broader than a detection target angular range handled by the first light emitting/receiving unit and the second light emitting/receiving unit, since the third light receiving element and the fourth light receiving element are only required to receive the detection light entering in the angular range within the half-value angle with relatively high sensitivity, the high position detection accuracy of the target object can be obtained.

The optical position detection device according to the aspect of the invention can be used in various types of systems such as a display system with an input function.

For example, in a display system with an input function having a display device provided with a display surface where an image is displayed, and an optical position detection device adapted to optically detect a position of a target object in a direction along the display surface, wherein the image is switched based on a result of the detection of the position of the target object in the optical position detection device, the optical position detection device according to the aspect of the invention can be used. Further, in a display system with an input function having an image projection device adapted to project an image, and an optical position detection device adapted to optically detect a position of a target object in a direction intersecting with a projection direction of the image, wherein the image is switched based on a result of the detection of the position of the target object in the optical position detection device, the optical position detection device according to the aspect of the invention can be used. Further, as other systems, the optical position detection device according to the aspect of the invention can be used for an input system to an electronic paper, a window system with an input function, or an amusement system with an input function.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
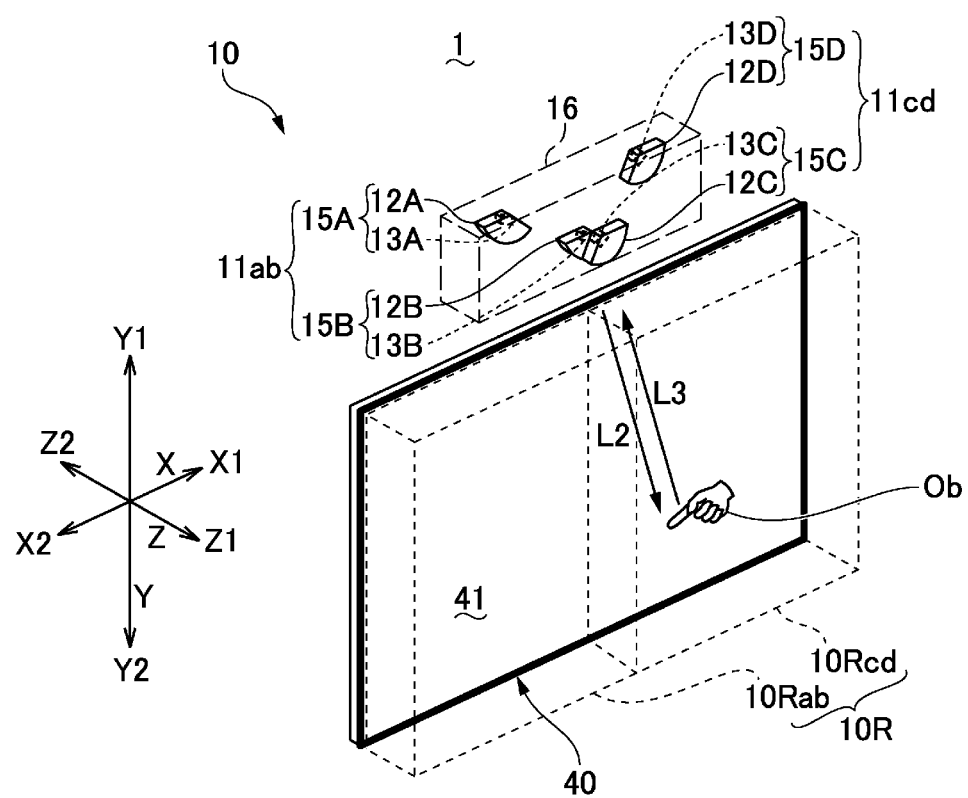
FIG. 1 is an explanatory diagram of an optical position detection device according to a first embodiment of the invention viewed from an oblique direction on an emission space side of detection light.

Then, some embodiments of the invention will be explained in detail with reference to the accompanying drawings. It should be noted that in the following explanation, directions perpendicular to each other are defined as an X-axis direction and a Y-axis direction, and a direction perpendicular to the X-axis direction and the Y-axis direction is defined as a Z-axis direction. Further, in the explanation, it is assumed that a "first direction" in the invention is the X-axis direction, a "second direction" is the Y-axis direction, and a "third direction" is the Z-axis direction. Further, in the drawings referred to below, things are shown assuming one side of the X-axis direction as an X1 side, the other side thereof as an X2 side, one side of the Y-axis direction as a Y1 side, the other side thereof as a Y2 side, one side of the Z-axis direction as a Z1 side, and the other side thereof as a Z2 side. Further, a detection target space is set on one side with respect to a light emitting/receiving unit. In the following explanation, the "one side" corresponds to the other side Y2 in the Y-axis direction.

Further, in the first embodiment and so on, although four light emitting/receiving units, four light source sections, and four light receiving elements, the first embodiment has the following relationship.

Light Emitting/Receiving Units are:
a first light emitting/receiving unit corresponding to a light emitting/receiving unit 15B;
a second light emitting/receiving unit corresponding to a light emitting/receiving unit 15C;
a third light emitting/receiving unit corresponding to a light emitting/receiving unit 15A; and
a fourth light emitting/receiving unit corresponding to a light emitting/receiving unit 15D.

Light Source Sections are:
a first light source section corresponding to a light source section 12B;
a second light source section corresponding to a light source section 12C;
a third light source section corresponding to a light source section 12A; and
a fourth light source section corresponding to a light source section 12D.

Light Receiving Elements are:
a first light receiving element corresponding to a light receiving element 13B;

a second light receiving element corresponding to a light receiving element 13C;

a third light receiving element corresponding to a light receiving element 13A; and a fourth light receiving element corresponding to a light receiving element 13D.

First Embodiment

Overall Configuration

FIG. 1 is an explanatory diagram of an optical position detection device according to the first embodiment of the invention viewed from an oblique direction on an emission space side of detection light.

In FIG. 1, a position detection system 1 according to the present embodiment has a visual plane forming member 40 provided with a visual plane 41 where information is viewed, and an optical position detection device 10 for detecting a position of a target object Ob located on a visual plane 41 side with respect to the visual plane forming member 40, and the visual plane 41 extends along an X-Y plane. Such a position detection system 1 can be used as a display system with an input function for detecting the position (an X-Y coordinate) of the target object Ob in the X-Y plane in a detection target space 10R described above and so on due to the optical position detection device 10.

The optical position detection device 10 has four light emitting/receiving units composed of the light emitting/receiving unit 15A, the light emitting/receiving unit 15B, the light emitting/receiving unit 15C, and the light emitting/receiving unit 15D. Such light emitting/receiving unit 15A, light emitting/receiving unit 15B, light emitting/receiving unit 15C, and light emitting/receiving unit 15D are disposed in a lump inside a cover 16 at a roughly center position of a longitudinal part extending in the X-axis direction in the visual plane forming member 40 on the one side Y1 of the Y-axis direction with respect to the visual plane forming member 40, and are located at a position projected on the one side Z1 of the Z-axis direction from the visual plane of the visual plane forming member 40. Further, as explained hereinafter, the light emitting/receiving units 15A through 15D are respectively provided with the light source sections 12A through 12D for emitting a detection light L2 along an imaginary plane (the X-Y plane) along the visual plane 41, and the light receiving elements 13A through 13D. Therefore, the light emitting/receiving unit 15A, the light emitting/receiving unit 15B, the light emitting/receiving unit 15C, and the light emitting/receiving unit 15D are capable of receiving the detection light L2 (a reflected light L3) reflected by the target object Ob with the light receiving elements 13A through 13D when emitting the detection light L2 from the light source sections 12A through 12D, and in the optical position detection device 10, a space (a detection light emission space, a space disposed along the visual plane 41) where the detection light L2 is emitted from the light source sections 12A through 12D is set to the detection target space 10R for detecting the position of the target object Ob.

Configuration of Light Emitting/Receiving Unit

Figure 2A:
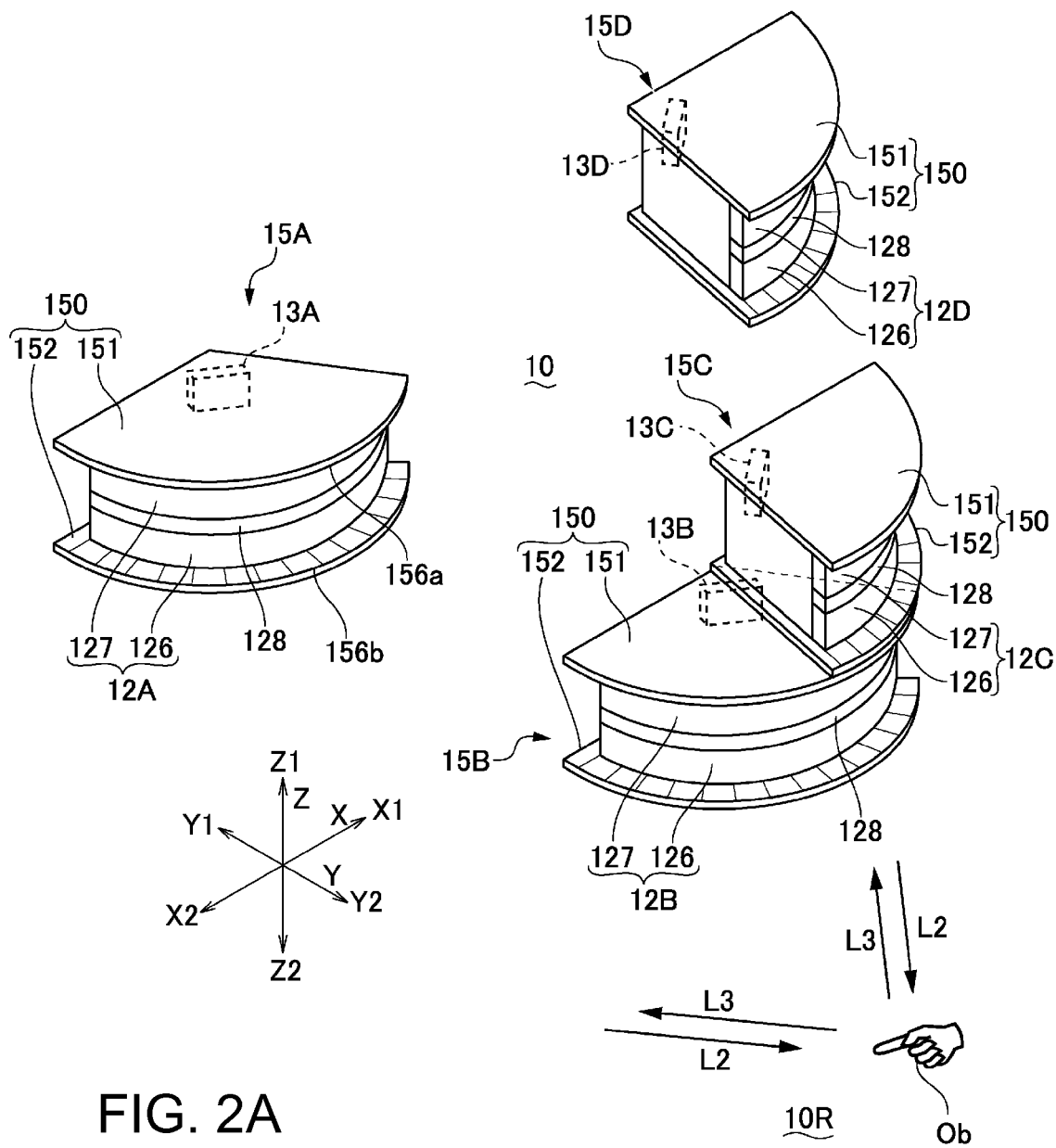
FIGS. 2A and 2B are explanatory diagrams of a light emitting/receiving unit used in the optical position detection device according to the first embodiment of the invention.
Figure 2B:
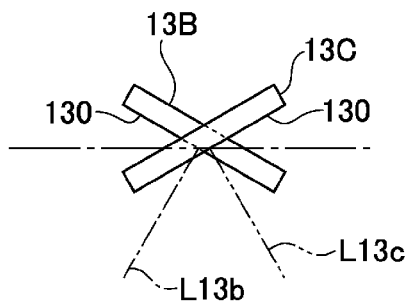
Figure 3:
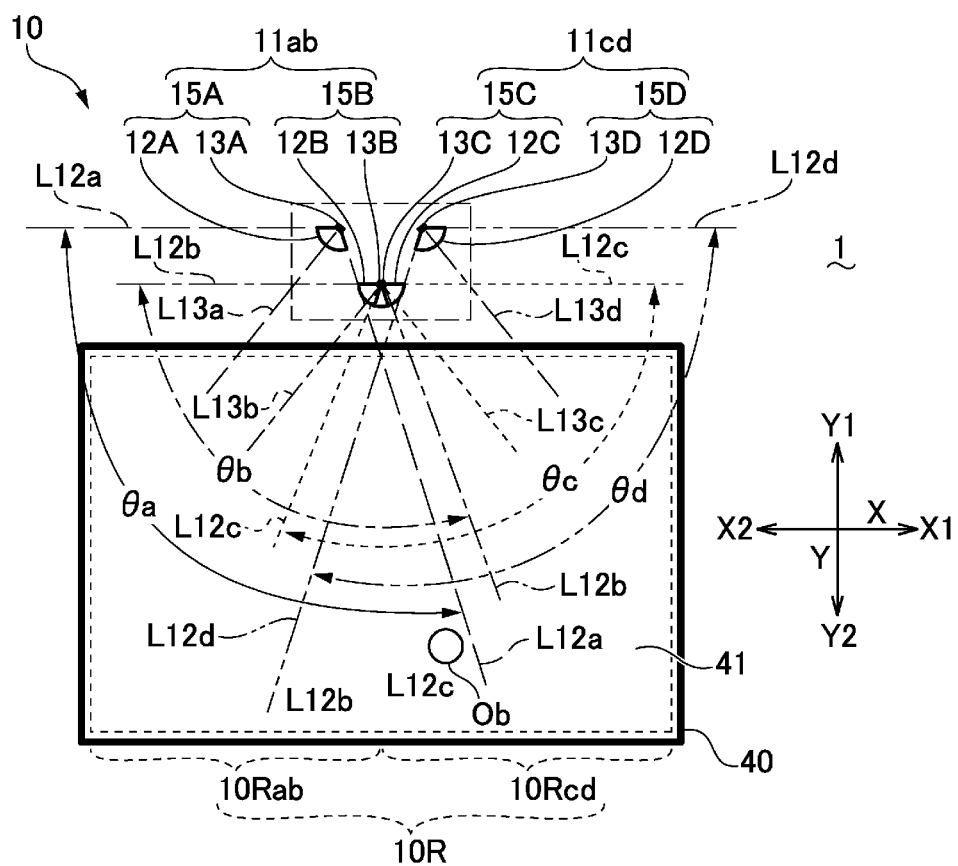
FIG. 3 is an explanatory diagram of the optical position detection device according to the first embodiment of the invention viewed from the front on the emission space side of the detection light.
Figure 4A:
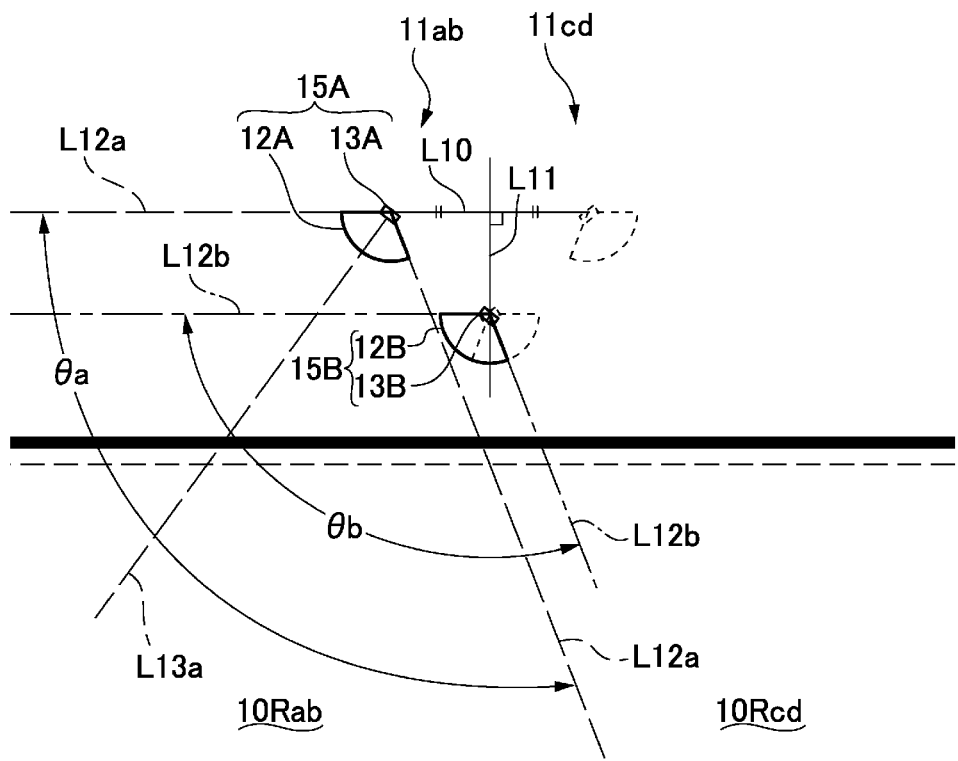
FIGS. 4A and 4B are explanatory diagrams of one of a pair of units used in the optical position detection device according to the first embodiment of the invention.
Figure 4B:
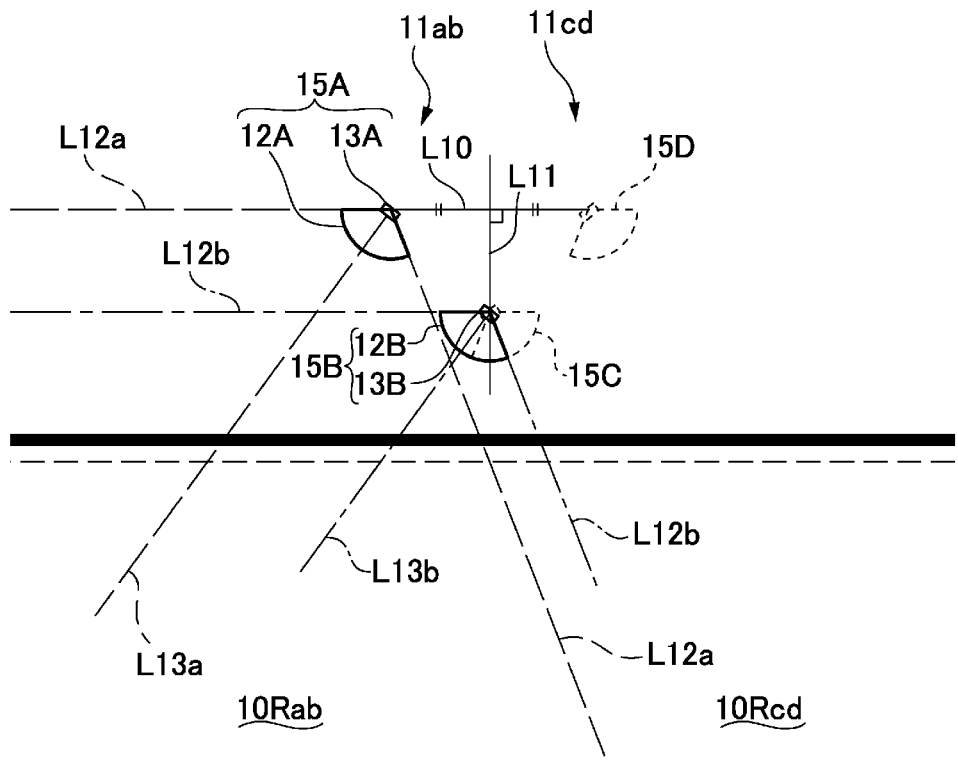
Figure 5A:
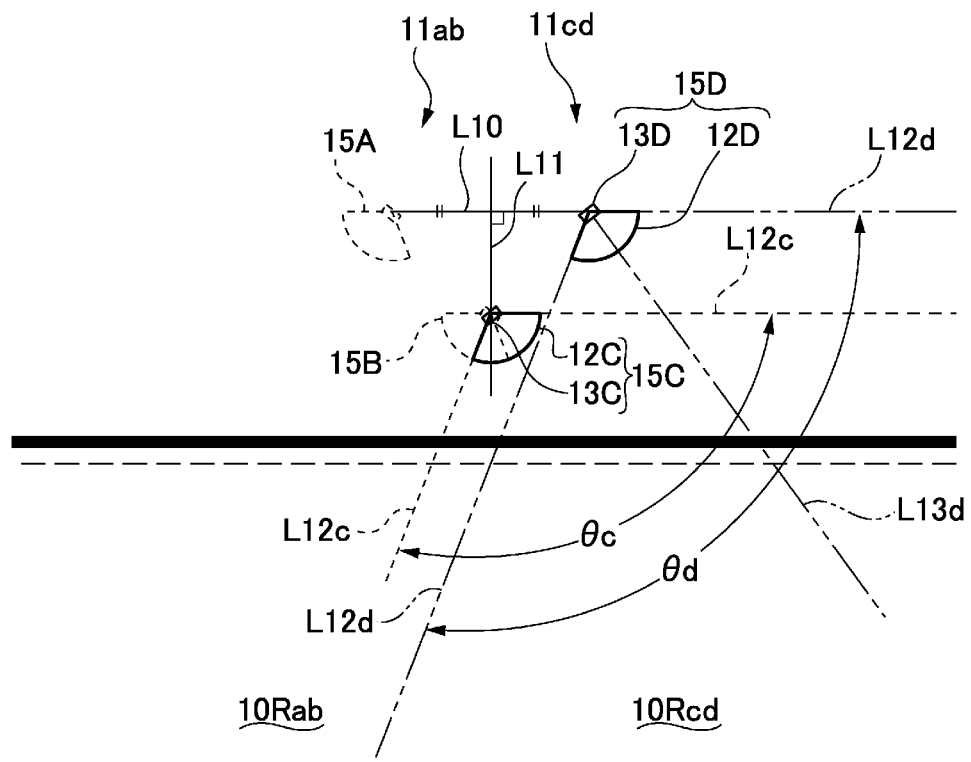
FIGS. 5A and 5B are explanatory diagrams of the other of the pair of units used in the optical position detection device according to the first embodiment of the invention.
Figure 5B:
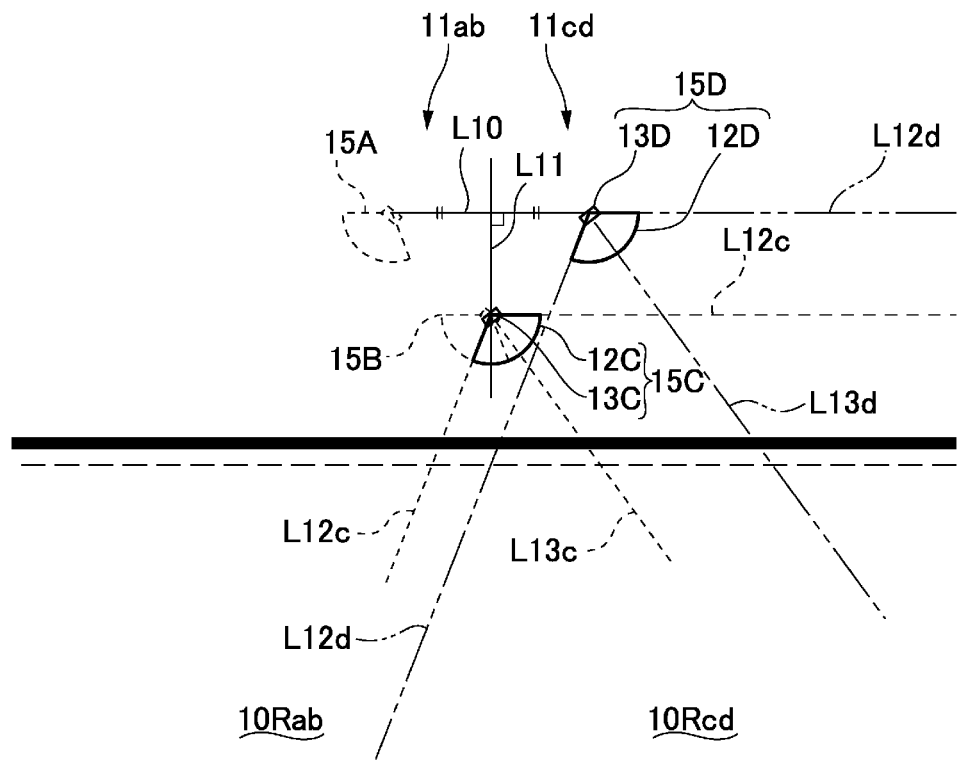
Figure 6:
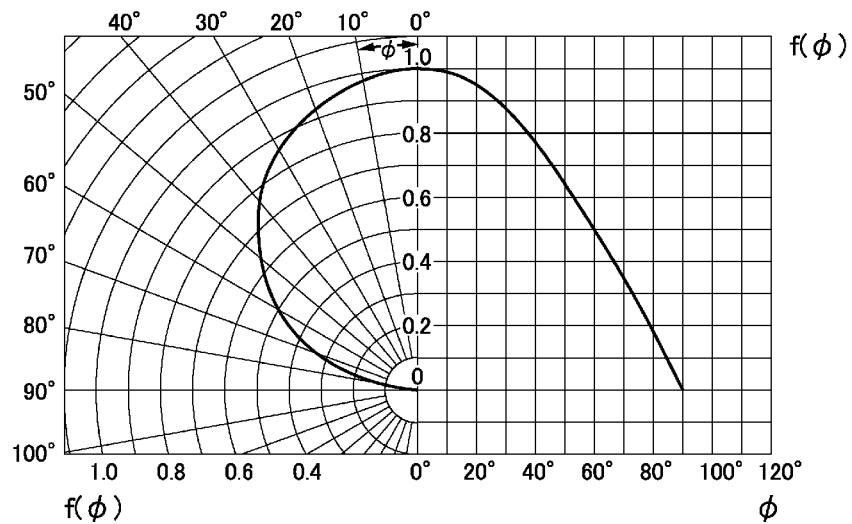
FIG. 6 is an explanatory diagram showing incident angle dependency of light reception sensitivity of a light receiving element used in the optical position detection device according to the first embodiment of the invention.

FIGS. 2A and 2B are explanatory diagrams of the light emitting/receiving units 15A through 15D used in the optical position detection device 10 according to the first embodiment of the invention, wherein FIG. 2A is an explanatory diagram showing a schematic configuration of the light emitting/receiving units 15A through 15D, and FIG. 2B is an explanatory diagram of the light receiving elements 13B, 13C (a first light receiving element and a second light receiving element) of the light emitting/receiving units 15B, 15C viewed from the one side Z1 of the Z-axis direction. FIG. 3 is an explanatory diagram of the optical position detection device 10 according to the first embodiment of the invention viewed from the front on the emission space side of the reflected light L3. FIGS. 4A and 4B are explanatory diagrams of one of a pair of units used in the optical position detection device 10 according to the first embodiment of the invention, wherein FIG. 4A is an explanatory diagram showing an emission angular range of the detection light L2 from the pair of units, and FIG. 4B is an explanatory diagram showing a light reception angular range of the detection light in the pair of units. FIGS. 5A and 5B are explanatory diagrams of the other of the pair of units used in the optical position detection device 10 according to the first embodiment of the invention, wherein FIG. 5A is an explanatory diagram showing an emission angular range of the detection light L2 from the pair of units, and FIG. 4B is an explanatory diagram showing a light reception angular range of the detection light in the pair of units. FIG. 6 is an explanatory diagram showing incident angle dependency (directivity in sensitivity) of light reception sensitivity of the light receiving elements 13A through 13D used in the optical position detection device 10 according to the first embodiment of the invention.

As shown in FIGS. 1 and 2A, in the light emitting/receiving units 15A through 15D, the light emitting/receiving unit 15A has a light source support member 150 having a fan-like shape when viewed from the Z-axis direction, and such a light source support member 150 has a structure composed of a first light source support member 151 and a second light source support member 152 stacked in the Z-axis direction, and the light source section 12A is formed between the first light source support member 151 and the second light source support member 152. The first light source support member 151 and the second light source support member 152 are respectively provided with brim sections 156a, 156b each having a semicircle shape, and the brim sections 156a, 156b limit an emission range of the detection light L2 in the Z-axis direction.

In the present embodiment, the first light source section 12A is provided with a first light source module 126 and a second light source module 127 disposed so as to be stacked in the Z-axis direction. Further, a part sandwiched in the Z-axis direction between the first light source module 126 and the second light source module 127 forms a light guide section 128 having light transmissive property, and the light receiving element 13A is disposed in the back of the light guide section 128. In the light emitting/receiving unit 15A, a central angle of the light source support member 150 is set to about 120°, and the light source section 12A is formed throughout an angular range of 100° through 120°.

The light emitting/receiving units 15B, 15C, and 15D also have substantially the same configurations as that of the light emitting/receiving unit 15A. Here, the light emitting/receiving unit 15B and the light emitting/receiving unit 15C are disposed so as to be stacked in the Z-axis direction, and the light receiving element 13B of the light emitting/receiving unit 15B and the light receiving element 13C of the light emitting/receiving unit 15C overlap each other in the Z-axis direction. Further, a light receiving surface 130 of the light receiving element 13B and the light receiving surface 130 of the light receiving element 13C overlap each other in the Z-axis direction, and intersect with each other when viewed from the Z-axis direction.

In FIGS. 3, 4A, and 4B, the light emitting/receiving unit 15A is provided with the light source section 12A and the light receiving element 13A. The light source section 12A radially emits the detection light L2 throughout a detection light emission angular range θa along the visual plane 41 of the visual plane forming member 40 as the emission angular range of the detection light L2 indicated by a long dashed line L12a. In the present embodiment, the detection light emission angular range θa of the light source section 12A is set to 100° through 120°. The light receiving element 13A is disposed at a position overlapping a radiation center of the detection light L2 emitted from the light source section 12A in the Z-axis direction, and the light reception angular range of the light receiving element 13A overlaps at least partially the detection light emission angular range θa of the light source section 12A.

Here, the light receiving element 13A is formed of a photodiode, and the light reception sensitivity of such a photodiode has incident angle dependency (directivity in sensitivity) shown in FIG. 6. Therefore, in the light receiving element 13A, a normal direction with respect to the light receiving surface corresponds to an angular direction of a sensitivity peak, and the light reception sensitivity to the detection light L2 entering from an angular direction smaller than a half thereof with respect to the normal direction is remarkably low. Therefore, in the light receiving element 13A, a half-value angular range in which the sensitivity is equal to or higher than a half of the sensitivity peak is used as the light reception angular range, and the light reception angular range of the light receiving element 13A is the range of ±60° centered on a direction (the normal direction with respect to the light receiving surface, a direction indicated by a dashed line L13a) in which the sensitivity peak is located. In the present embodiment, the direction in which the sensitivity peak of the light receiving element 13A is located is set to a direction dividing the detection light emission angular range θa of the light source section 12A in half. Therefore, the light reception angular range of the light receiving element 13A overlaps the detection light emission angular range θa of the light source section 12A throughout a wide angular range. The light emitting/receiving unit 15B is provided with the light source section 12B and the light receiving element 13B similarly to the light emitting/receiving unit 15A. The light source section 12B radially emits the detection light L2 throughout a detection light emission angular range θb along the visual plane 41 of the visual plane forming member 40 as the emission angular range of the detection light L2 indicated by a dashed-dotted line L12b. In the present embodiment, the detection light emission angular range θb of the light source section 12B is set to 100° through 120°. The light receiving element 13B is disposed at a position overlapping the radiation center of the detection light L2 emitted from the light source section 12B in the Z-axis direction, and the light reception angular range of the light receiving element 13B overlaps at least partially the detection light emission angular range θb of the light source section 12B. More specifically, similarly to the light receiving element 13A, the light receiving element 13B has the sensitivity with the incident angle dependency, and a direction (the normal direction with respect to the light receiving surface) in which the sensitivity peak thereof is located is indicated by a dashed-dotted line L13b. In the light receiving element 13B, the half-value angular range in which the sensitivity is equal to or higher than a half of the sensitivity peak is used as the light reception angular range, and such a light reception angular range is the range of ±60° centered on the direction (the direction indicated by the dashed-dotted line L13b) in which the sensitivity peak is located similarly to the light receiving element 13A. In the present embodiment, the direction in which the sensitivity peak of the light receiving element 13B is located is set to a direction dividing the detection light emission angular range θb of the light source section 12B in half. Therefore, the light reception angular range of the light receiving element 13B overlaps the detection light emission angular range θb of the light source section 12B throughout a wide angular range.

As shown in FIGS. 3, 5A, and 5B, the light emitting/receiving unit 15C is provided with the light source section 12C and the light receiving element 13C similarly to the light emitting/receiving unit 15A and so on. The light source section 12C radially emits the detection light L2 throughout a detection light emission angular range θc along the visual plane 41 of the visual plane forming member 40 as the emission angular range of the detection light L2 indicated by a dotted line L12c. In the present embodiment, the detection light emission angular range θc of the light source section 12C is set to 100° through 120° similarly to the light emitting/receiving units 15A, 15B. The light receiving element 13C is disposed at a position overlapping the radiation center of the detection light L2 emitted from the light source section 12C in the Z-axis direction, and the light reception angular range of the light receiving element 13C overlaps at least partially the detection light emission angular range θc of the light source section 12C. More specifically, similarly to the light receiving element 13A and so on, the light receiving element 13C has the sensitivity with the incident angle dependency, and a direction (the normal direction with respect to the light receiving surface) in which the sensitivity peak thereof is located is indicated by a dotted line L13c. In the light receiving element 13C, the half-value angular range in which the sensitivity is equal to or higher than a half of the sensitivity peak is used as the light reception angular range, and such a light reception angular range is the range of ±60 centered on the direction (the direction indicated by the dotted line L13c) in which the sensitivity peak is located similarly to the light receiving element 13A and so on. In the present embodiment, the direction in which the sensitivity peak of the light receiving element 13C is located is set to a direction dividing the detection light emission angular range θc of the light source section 12C in half. Therefore, the light reception angular range of the light receiving element 13C overlaps the detection light emission angular range θc of the light source section 12C throughout a wide angular range.

The light emitting/receiving unit 15D is provided with the light source section 12D and the light receiving element 13D similarly to the light emitting/receiving unit 15A and so on. The light source section 12D radially emits the detection light L2 throughout a detection light emission angular range θd along the visual plane 41 of the visual plane forming member 40 as the emission angular range of the detection light L2 indicated by a dashed-two dotted line L12d. In the present embodiment, the detection light emission angular range θd of the light source section 12D is set to 100° through 120°. The light receiving element 13D is disposed at a position overlapping the radiation center of the detection light L2 emitted from the light source section 12D in the Z-axis direction, and the light reception angular range of the light receiving element 13D overlaps at least partially the detection light emission angular range θd of the light source section 12D. More specifically, similarly to the light receiving element 13A and so on, the light receiving element 13D has the sensitivity with the incident angle dependency, and a direction (the normal direction with respect to the light receiving surface) in which the sensitivity peak thereof is located is indicated by a dashed-two dotted line L13d. In the light receiving element 13D, the half-value angular range in which the sensitivity is equal to or higher than a half of the sensitivity peak is used as the light reception angular range, and such a light reception angular range is the range of ±60° centered on the direction (the direction indicated by the dashed-two dotted line L13d) in which the sensitivity peak is located similarly to the light receiving element 13A. In the present embodiment, the direction in which the sensitivity peak of the light receiving element 13D is located is set to a direction dividing the detection light emission angular range θd of the light source section 12D in half. Therefore, the light reception angular range of the light receiving element 13D overlaps the detection light emission angular range θd of the light source section 12D throughout a wide angular range.

In the present embodiment, the light source section 12A, the light source section 12B, the light source section 12C, and the light source section 12D are each provided with a light source formed of a light emitting diode (LED) as described later, and radially emit the detection light L2 of an infrared ray having a peak wavelength existing in a range of 840 through 1000 nm. The light receiving element 13A, the light receiving element 13B, the light receiving element 13C, and the light receiving element 13D are each provided with a photodiode having the sensitivity peak in an infrared range as the light receiving element.

In the present embodiment, the four light emitting/receiving units 15A through 15D are sequentially switched to an ON state unit by unit. Therefore, when the light source section 12A of the light emitting/receiving unit 15A lights to emit the detection light L2, the detection light L2 reflected by the target object Ob is detected by the light receiving element 13A of the light emitting/receiving unit 15A, and when the light source section 12B of the light emitting/receiving unit 15B lights to emit the detection light L2, the detection light L2 reflected by the target object Ob is detected by the light receiving element 13B of the light emitting/receiving unit 15B. Further, when the light source section 12C of the light emitting/receiving unit 15C lights to emit the detection light L2, the detection light L2 reflected by the target object Ob is detected by the light receiving element 13C of the light emitting/receiving unit 15C, and when the light source section 12D of the light emitting/receiving unit 15D lights to emit the detection light L2, the detection light L2 reflected by the target object Ob is detected by the light receiving element 13D of the light emitting/receiving unit 15D.

Configuration of Pair of Units

As shown in FIGS. 3, 4A, 4B, 5A, and 5B, in the present embodiment, since a layout described later is adopted, the detection light emission angular range θa of the light source section 12A and the detection light emission angular range θb of the light source section 12B at least partially overlap each other in the light emitting/receiving unit 15A and the light emitting/receiving unit 15B. Further, the light reception angular range of the light receiving element 13A and the light reception angular range of the light receiving element 13B at least partially overlap each other. Therefore, the light emitting/receiving unit 15A and the light emitting/receiving unit 15B are capable of detecting the position of the target object Ob located in a space where the detection light emission angular range θa of the light source section 12A, the detection light emission angular range θb of the light source section 12B, the light reception angular range of the light receiving element 13A, and the light reception angular range of the light receiving element 13B overlap each other due to a principle described later. Therefore, in the present embodiment, a space overlapping the visual plane 41 in the Z-axis direction out of the space described above corresponds to a detection target space 10Rab formed by a first pair of units 11ab composed of the light emitting/receiving unit 15A and the light emitting/receiving unit 15B.

Further, in the light emitting/receiving unit 15C and the light emitting/receiving unit 15D, the detection light emission angular range θc of the light source section 12C and the detection light emission angular range θd of the light source section 12D at least partially overlap each other. Further, the light reception angular range of the light receiving element 13C and the light reception angular range of the light receiving element 13D at least partially overlap each other. Therefore, the light emitting/receiving unit 15C and the light emitting/receiving unit 15D are capable of detecting the position of the target object Ob located in a space where the detection light emission angular range θc of the light source section 12C, the detection light emission angular range θd of the light source section 12D, the light reception angular range of the light receiving element 13C, and the light reception angular range of the light receiving element 13D overlap each other due to a principle described later. Therefore, in the present embodiment, a space overlapping the visual plane 41 in the Z-axis direction out of the space described above corresponds to a detection target space 10Rcd formed by a second pair of units 11cd composed of the light emitting/receiving unit 15C and the light emitting/receiving unit 15D.

Layout etc. of Light Emitting/Receiving Units

In the present embodiment, by adopting the layout explained below with reference to FIGS. 3, 4A, 4B, 5A, and 5B, the detection target space 10Rab formed by the first pair of units 11ab and the detection target space 10Rcd formed by the second pair of units 11cd are disposed adjacent to each other to thereby constitute the detection target space 10R integrally contiguous to each other as a whole.

In the present embodiment, firstly, the light emitting/receiving units 15A, 15D are disposed so as to be distant from each other in the X-axis direction on the one side Y1 of the Y-axis direction with respect to the visual plane forming member 40. Further, the light emitting/receiving units 15A, 15D are disposed at the same position in the Y-axis direction. Therefore, an imaginary line segment L10 connecting the light emitting/receiving unit 15A and the light emitting/receiving unit 15D is parallel to a side portion of the visual plane forming member 40 extending in the X-axis direction.

Further, the light emitting/receiving units 15B, 15C are disposed on one side (the other side Y2 of the Y-axis direction) of the Y-axis direction with respect to the light emitting/receiving units 15A, 15D, and are located in the Y-axis direction between the visual plane forming member 40 and the place where the light emitting/receiving units 15A, 15D are disposed.

Here, taking an imaginary perpendicular bisector L11 with respect to the imaginary line segment L10 connecting between the light emitting/receiving unit 15A and the light emitting/receiving unit 15D as a reference, the light emitting/receiving units 15B, 15C are disposed at a position distant on the other side Y2 (the side on which the detection target space 10R is located) of the Y-axis direction from the line segment L10 on the perpendicular bisector L11. Therefore, in the X-axis direction, the light emitting/receiving units 15A, 15D are located on the outer side of the light emitting/receiving units 15B, 15C.

Further, the light emitting/receiving unit 15C is disposed at a position overlapping the light emitting/receiving unit 15B on the one side Z1 of the Z-axis direction, and the radiation center position of the detection light L2 in the light emitting/receiving unit 15B and the radiation center position of the detection light L2 in the light emitting/receiving unit 15C roughly overlap each other. Therefore, the radiation center position of the detection light L2 in the light emitting/receiving unit 15A, the radiation center position of the detection light L2 in the light emitting/receiving unit 15D, and the radiation center position (the radiation center position of the detection light L2 in the light emitting/receiving unit 15C) of the detection light L2 in the light emitting/receiving unit 15B form an equilateral triangle.

Directions etc. of Light Emitting/Receiving Units

In the present embodiment, the positions of the light emitting/receiving units 15A through 15D are arranged as described above, and at the same time, the directions of the light emitting/receiving units are set as explained below with reference to FIGS. 3, 4A, 4B, 5A, and 5B to thereby make the detection target space 10Rab formed by the first pair of units 11ab and the detection target space 10Rcd formed by the second pair of units 11cd adjacent to each other in the X-axis direction so as to sandwich the perpendicular bisector L11 extending in the Y-axis direction therebetween, and thus constituting the detection target space 10R integrally contiguous as a whole.

Firstly, in the first pair of units 11ab, the light source sections 12A, 12B of the light emitting/receiving units 15A, 15B have the respective detection light emission angular ranges θa, θb each corresponding to the angular range of 100° through 120° formed between a direction (a direction perpendicular to the perpendicular bisector L11) extending to the other side X2 of the X-axis direction and a direction tilted at 10° through 30° to the one side X1 (in a counterclockwise direction) of the X-axis direction with respect to the perpendicular bisector L11. Further, the direction in which the sensitivity peak is located in the light receiving elements 13A, 13B is a direction tilted at an angle of 30° through 40° clockwise with respect to the perpendicular bisector L11, and an angle formed between the direction in which the sensitivity peak is located and the perpendicular bisector L11 is equal to or smaller than 60°. Here, in the light receiving elements 13A, 13B, the angular range of ±60° with respect to the direction in which the sensitivity peak is located corresponds to the light reception angular range. Moreover, since the light emitting/receiving unit 15A is located on the one side Y1 of the Y-axis direction from the light emitting/receiving unit 15B, but is located on the other side X2 of the X-axis direction from the light emitting/receiving unit 15B, there is no chance that light emission/reception of the detection light L2 in the light emitting/receiving unit 15A is blocked by the light emitting/receiving unit 15B. Therefore, a space located on the other side X2 of the X-axis direction from the perpendicular bisector L11 out of the detection target space 10R is entirely included in the space in which the detection light emission angular range θa of the light source section 12A, the detection light emission angular range θb of the light source section 12B, the light reception angular range by the light receiving element 13A, and the light reception angular range by the light receiving element 13B overlap each other. Therefore, the space located on the other side X2 of the X-axis direction from the perpendicular bisector L11 out of the detection target space 10R entirely becomes the detection target space 10Rab formed by the first pair of units 11ab.

Further, the second pair of units 11 cd is disposed line symmetrically with respect to the first pair of units 11ab centered on the perpendicular bisector L11.

Therefore, light emission/reception of the detection light L2 in the light emitting/receiving unit 15D is never blocked by the light emitting/receiving unit 15C. Therefore, a space located on the one side X1 of the X-axis direction from the perpendicular bisector L11 out of the detection target space 10R is entirely included in the space in which the detection light emission angular range θc of the light source section 12C, the detection light emission angular range θd of the light source section 12D, the light reception angular range by the light receiving element 13C, and the light reception angular range by the light receiving element 13D overlap each other. Therefore, the space located on the one side X1 of the X-axis direction from the perpendicular bisector L11 out of the detection target space 10R entirely becomes the detection target space 10Rcd formed by the second pair of units 11cd.

In the present embodiment, it is preferable that in the in-plane direction (an in-plane direction of an imaginary plane) of the X-Y plane, an angle formed between the normal direction with respect to the light receiving surface of the light receiving element 13A and the perpendicular bisector L11 is equal to or smaller than an angle formed between the normal direction with respect to the light receiving plane of the light receiving element 13B and the perpendicular bisector L11. Further, it is preferable that in the in-plane direction (the in-plane direction of the imaginary plane) of the X-Y plane, an angle formed between the normal direction with respect to the light receiving surface of the light receiving element 13D and the perpendicular bisector L11 is equal to or smaller than an angle formed between the normal direction with respect to the light receiving plane of the light receiving element 13C and the perpendicular bisector L11.

In other words, in the in-plane direction (the in-plane direction of the imaginary plane) of the X-Y plane, although the angle formed between the normal direction with respect to the light receiving surface of the light receiving element 13A and the perpendicular bisector L11 and the angle formed between the normal direction with respect to the light receiving surface of the light receiving element 13B and the perpendicular bisector L11 are equal to each other, it is preferable that the angle formed between the normal direction with respect to the light receiving surface of the light receiving element 13A and the perpendicular bisector L11 is smaller than the angle formed between the normal direction with respect to the light receiving surface of the light receiving element 13B and the perpendicular bisector L11.

Similarly, in the present embodiment, in the in-plane direction (the in-plane direction of the imaginary plane) of the X-Y plane, although the angle formed between the normal direction with respect to the light receiving surface of the light receiving element 13D and the perpendicular bisector L11 and the angle formed between the normal direction with respect to the light receiving surface of the light receiving element 13C and the perpendicular bisector L11 are equal to each other, it is preferable that the angle formed between the normal direction with respect to the light receiving surface of the light receiving element 13D and the perpendicular bisector L11 is smaller than the angle formed between the normal direction with respect to the light receiving surface of the light receiving element 13C and the perpendicular bisector L11.

Detailed Configuration of Light Emitting/Receiving Units

Figure 7:
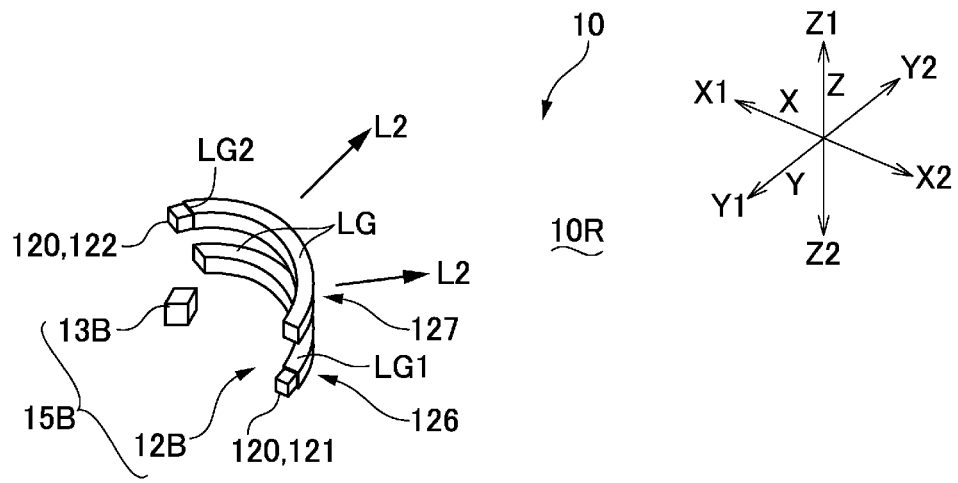
FIG. 7 is an explanatory diagram showing a principal part of the light emitting/receiving units shown in FIGS. 4A and 4B.
Figure 7:
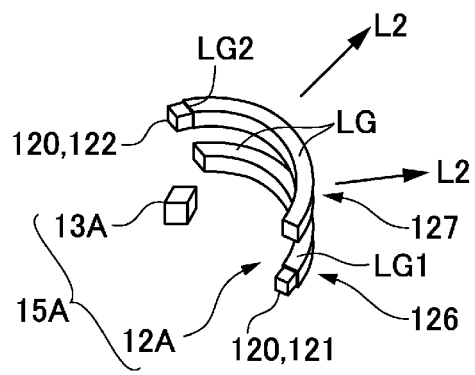
Figure 8A:
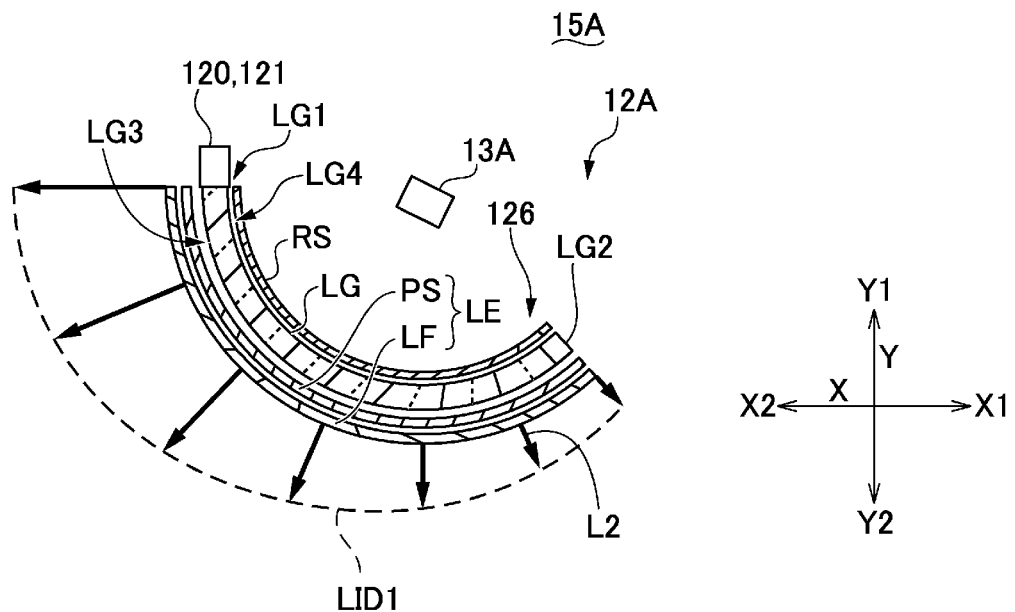
FIGS. 8A and 8B are explanatory diagrams schematically showing a configuration of a light source section shown in FIG. 7.
Figure 8B:
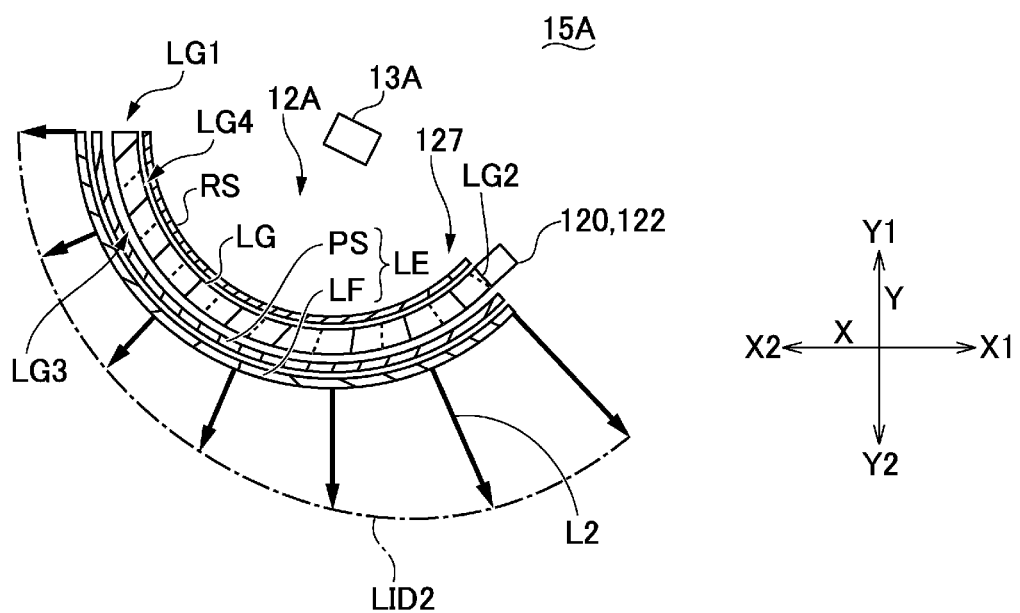

FIG. 7 is an explanatory diagram showing a principal part of the light emitting/receiving units shown in FIG. 2A. FIGS. 8A and 8B are explanatory diagrams schematically showing the configuration of the light source section shown in FIG. 7, and are an explanatory diagram showing how the detection light L2 is emitted in a first lighting operation, and an explanatory diagram showing how the detection light L2 is emitted in a second lighting operation, respectively.

As shown in FIG. 7, in the light emitting/receiving unit 15A, each of the first light source module 126 and the second light source module 127 is provided with a light source 120 formed of a light emitting element such as a light emitting diode and a light guide LG. Also in the light emitting/receiving unit 15B, similarly to the light emitting/receiving unit 15A, each of the first light source module 126 and the second light source module 127 is provided with the light source 120 formed of a light emitting element such as a light emitting diode and the light guide LG.

More specifically, as shown in FIGS. 8A and 8B, the first light source module 126 is provided with a first light source 121 formed of a light emitting element such as a light emitting diode for emitting infrared light as the light source 120, and at the same time is provided with the light guide LG having a circular arc shape, and the first light source 121 is disposed at one end portion LG1 of the light guide LG. Further, the first light source module 126 is provided with an irradiation direction setting section LE having a circular arc shape, which has an optical sheet PS, a louver film LF, and so on, along an outer peripheral surface LG3 having a circular arc shape of the light guide LG, and is provided with a reflecting sheet RS having a circular arc shape along an inner peripheral surface LG4 having a circular arc shape of the light guide LG. Further, similarly to the first light source module 126, the second light source module 127 is also provided with a second light source 122 formed of a light emitting element such as a light emitting diode for emitting infrared light as the light source 120, and at the same time is provided with the light guide LG having a circular arc shape, and the second light source 122 is disposed at the other end portion LG2 of the light guide LG. Further, similarly to the first light source module 126, the second light source module 127 is provided with the irradiation direction setting section LE having a circular arc shape, which has the optical sheet PS, the louver film LF, and so on, along the outer peripheral surface LG3 having a circular arc shape of the light guide LG, and is provided with the reflecting sheet RS having a circular arc shape along the inner peripheral surface LG4 having a circular arc shape of the light guide LG. It should be noted that a processing for controlling emission efficiency of the detection light from the light guide LG is performed on at least one of the outer peripheral surface and the inner peripheral surface of the light guide LG, and as such a processing method there can be adopted, for example, a method of printing reflecting dots, a molding method for providing unevenness using a stamper or an injection process, and a groove formation method. The light emitting/receiving unit 15B also has substantially the same configuration as that of the light emitting/receiving unit 15A, and therefore, the explanation therefor will be omitted. It should be noted that the light emitting/receiving units 15C, 15D explained with reference to FIG. 1 and so on have the same configurations as those of the light emitting/receiving units 15A, 15B, and therefore, the explanation therefor will be omitted.

Configuration of Position Detection Section etc.

Figure 9:
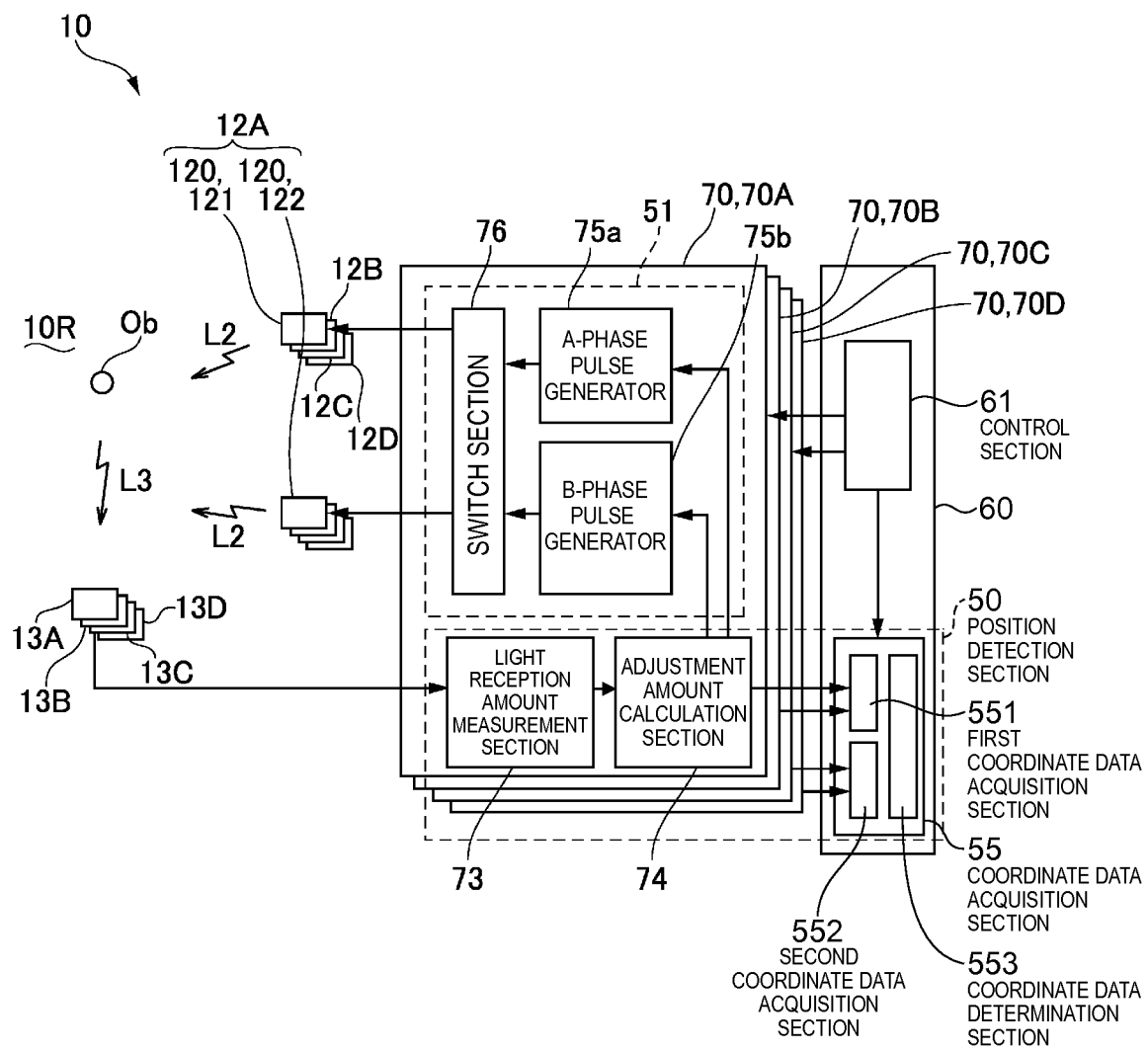
FIG. 9 is an explanatory diagram showing an electrical configuration and so on of the optical position detection device according to the first embodiment of the invention.

FIG. 9 is an explanatory diagram showing an electrical configuration of the optical position detection device 10 according to the first embodiment of the invention. In the optical position detection device 10 according to the present embodiment, the light emitting/receiving unit 15A, the light emitting/receiving unit 15B, the light emitting/receiving unit 15C, and the light emitting/receiving unit 15D explained with reference to FIGS. 1, 2A, 2B, 3, 4A, 4B, 5A, 5B, 6, 7, 8A, and 8B are each electrically connected to a controlling IC 70 shown in FIG. 9. Here, the controlling IC 70 is configured so as to correspond to a single light emitting/receiving unit in some cases, or configured so as to correspond to a plurality of light emitting/receiving units in some other cases, and FIG. 9 exemplifies the case in which the controlling IC 70 is configured so as to correspond to the single light emitting/receiving unit. Therefore, four controlling ICs composed of a controlling IC 70A, a controlling IC 70B, a controlling IC 70C, and a controlling IC 70D are used as the controlling ICs 70 in the present embodiment, and such controlling ICs 70 are electrically connected to the light emitting/receiving unit 15A, the light emitting/receiving unit 15B, the light emitting/receiving unit 15C, and the light emitting/receiving unit 15D, respectively. Further, the four controlling ICs 70 have the same configurations, and are electrically connected to a common control device 60.

The controlling IC 70A among the four controlling ICs 70 has a plurality of circuits (not shown) for generating a reference clock, A-phase reference pulses, B-phase reference pulses, timing control pulses, a synchronous clock, and so on. Further, the controlling IC 70A has a pulse generator 75a for generating predetermined drive pulses based on the A-phase reference pulses, a pulse generator 75b for generating predetermined drive pulses based on the B-phase reference pulses, and a switch section 76 for controlling which one of the light sources 120 (the first light source 121 and the second light source 122) of the light source section 12A is provided with the drive pulses generated by the pulse generator 75a and the pulse generator 75b. Such pulse generators 75a, 75b, and the switch section 76 constitute a light source drive section 51. Further, the controlling IC 70A is provided with a light reception amount measurement section 73 having, for example, an amplification section for amplifying a detection result in the light receiving element 13A, and an adjustment amount calculation section 74 for controlling the pulse generators 75a, 75b based on a measurement result in the light reception amount measurement section 73 to thereby adjust a current level of the drive pulses to be supplied to the light source 120 (the first light source 121 and the second light source 122) of the light source section 12A. The light reception amount measurement section 73 and the adjustment amount calculation section 74 described above take on some of the function of a position detection section 50.

The other controlling ICs 70B, 70C, and 70D have substantially the same configurations as that of the controlling IC 70A. The four controlling ICs 70 described above are controlled by a control section 61 of the host control device 60 such as a personal computer, and such a control device 60 has a coordinate data acquisition section 55 constituting the position detection section 50 together with the light reception amount measurement section 73 and the adjustment amount calculation section 74. Therefore, in the present embodiment, the position detection section 50 is composed of the light reception amount measurement section 73 and the adjustment amount calculation section 74 of the controlling IC 70, and the coordinate data acquisition section 55 of the host control device 60 (the personal computer).

The coordinate data acquisition section 55 has a first coordinate data acquisition section 551 for obtaining coordinate data (X-Y coordinate data) of the target object Ob in the detection target space 10Rab using the light emitting/receiving units 15A, 15B due to a principle described later, and a second coordinate data acquisition section 552 for obtaining coordinate data (X-Y coordinate data) of the target object Ob in the detection target space 10Rcd using the light emitting/receiving units 15C, 15D. Further, the coordinate data acquisition section 55 is provided with a coordinate data determination section 553 for determining coordinate data (X-Y coordinate data) of the target object Ob based on the result obtained by the first coordinate data acquisition section 551 and the second coordinate data acquisition section 552.

Coordinate Detection Principle

Figure 10A:
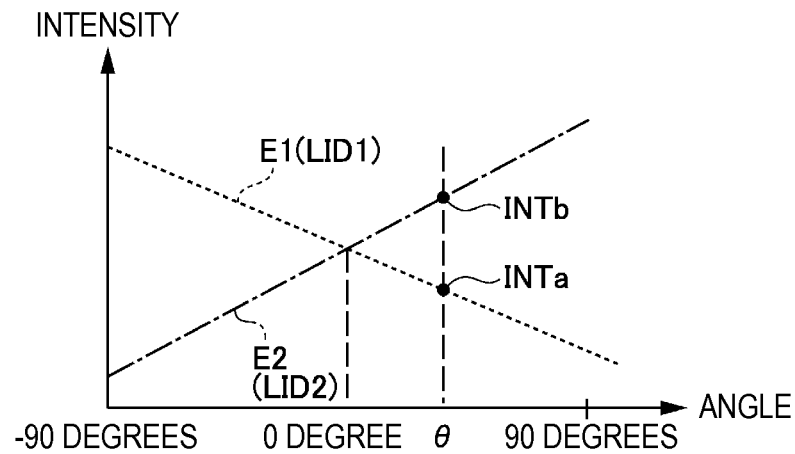
FIGS. 10A and 10B are explanatory diagrams showing a position detection principle in the optical position detection device according to the first embodiment of the invention.
Figure 10B:
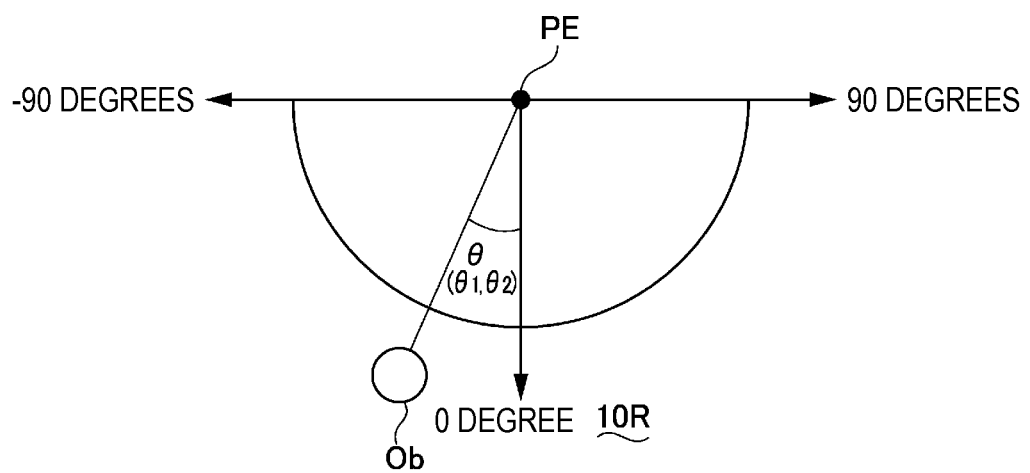
Figure 11:
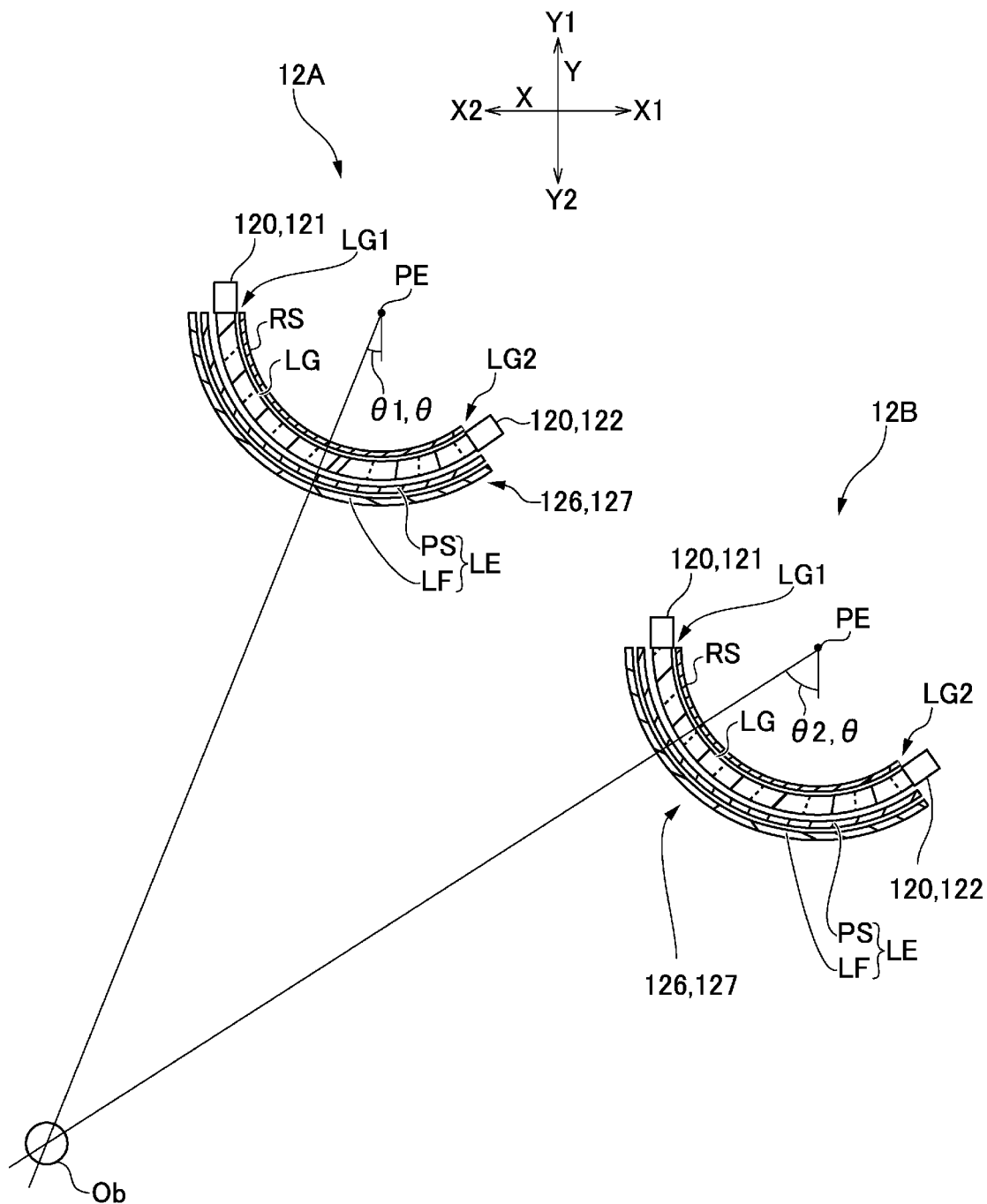
FIG. 11 is an explanatory diagram showing a principle of detecting an angular position of a target object in the optical position detection device according to the first embodiment of the invention.

FIGS. 10A and 10B are explanatory diagrams showing a position detection principle in the optical position detection device 10 according to the first embodiment of the invention, wherein FIG. 10A is an explanatory diagram of a light intensity distribution, and FIG. 10B is an explanatory diagram of a method of obtaining position information (orientation information) of the location of the target object. FIG. 11 is an explanatory diagram showing a principle of detecting an angular position of the target object Ob in the optical position detection device 10 according to the first embodiment of the invention.

In the optical position detection device 10 according to the present embodiment, in order for detecting the coordinate data (the X-Y coordinate data) of the target object Ob in the detection target space 10Rab, the light source drive section 51 of the controlling IC 70A drives the light source section 12A of the light emitting/receiving unit 15A to perform the first lighting operation in which the emission intensity of the detection light L2 decreases in a direction from one side of the detection light emission angular range θa toward the other side thereof, and the second lighting operation in which the emission intensity of the detection light L2 decreases in a direction from the other side of the detection light emission angular range θa toward the one side thereof. Further, the light source drive section 51 of the controlling IC 70B drives the light source section 12B of the light emitting/receiving unit 15B to perform the first lighting operation in which the emission intensity of the detection light L2 decreases in a direction from one side of the detection light emission angular range θb toward the other side thereof, and the second lighting operation in which the emission intensity of the detection light L2 decreases in a direction from the other side of the detection light emission angular range θb toward the one side thereof.

More specifically, in the first lighting operation, the light source drive section 51 of the controlling IC 70A lights the first light source 121 of the first light source module 126 in the light source section 12A of the light emitting/receiving unit 15A to thereby emit the detection light L2 to the detection target space 10R. On this occasion, the second light source 122 is kept in an extinction state. As a result, a first light intensity distribution LID1 is formed in the detection target space 10R. Such a first light intensity distribution LID1 is an intensity distribution in which the intensity is monotonically decreased in a direction from the angular direction corresponding to the one end portion LG1 toward the angular direction corresponding to the other end portion LG2 as shown in FIG. 8A in which the length of arrows represents the intensity of the emitted light. Further, in the second lighting operation, the light source drive section 51 of the controlling IC 70A lights the second light source 122 of the second light source module 127 in the light source section 12A of the light emitting/receiving unit 15A to thereby emit the detection light L2 to the detection target space 10R. On this occasion, the first light source 121 is kept in the extinction state. As a result, a second light intensity distribution LID2 is formed in the detection target space 10R. Such a second light intensity distribution LID2 is an intensity distribution in which the intensity is monotonically decreased in a direction from the angular direction corresponding to the other end portion LG2 toward the angular direction corresponding to the one end portion LG1 as shown in FIG. 8B in which the length of arrows represents the intensity of the emitted light.

It should be noted that the light source drive section 51 of the controlling IC 70B makes the light source section 12B of the light emitting/receiving unit 15B perform the first lighting operation of lighting the first light source 121 of the first light source module 126 and the second lighting operation of lighting the second light source 122 of the second light source module 127 to thereby form the first light intensity distribution LID1 and the second light intensity distribution LID2, as in the case of the light source section 12A.

Therefore, as will be explained below, since the positions of the light source section 12A and the light source section 12B are fixed, by using the first light intensity distribution LID1 and the second light intensity distribution LID2, the coordinate data (the X-Y coordinate data) of the target object θb in the detection target space 10Rab can be detected.

Detection of Angular Position of Target Object Ob

Firstly, when forming the first light intensity distribution LID1 using the light source section 12A of the light emitting/receiving unit 15A, the irradiation direction of the detection light L2 and the intensity of the detection light L2 are in the relationship represented by a line E1 shown in FIG. 10A. Further, when forming the second light intensity distribution LID2 using the light source section 12A of the light emitting/receiving unit 15A, the irradiation direction of the detection light L2 and the intensity of the detection light L2 are in the relationship represented by a line E2 shown in FIG. 10A. Here, it is assumed that the target object Ob is located in a direction of an angle θ viewed from a center PE of the light source section 12A as shown in FIGS. 10B and 11. In this case, when forming the first light intensity distribution LID1, the intensity of the detection light L2 at the position where the target object Ob is located becomes INTa. In contrast, when forming the second light intensity distribution LID2, the intensity of the detection light L2 at the position where the target object Ob is located becomes INTb. Therefore, by obtaining the relationship between the intensities INTa, INTb by comparing the detected intensity in the light receiving element 13A when forming the first light intensity distribution LID1 and the detected intensity in the light receiving element 13A when forming the second light intensity distribution LID2 with each other, the angle θ (an angle θ1) of the direction in which the target object Ob is located can be obtained based on the center PE of the light source section 12A as shown in FIGS. 10B and 11.

In detecting the angular position (the angle θ1) of the target object Ob using such a principle, in the present embodiment, the angle θ (the angle θ1) of the direction in which the target object Ob is located is obtained based on a ratio of drive currents or a ratio of adjustment values of the drive currents when the drive currents of the first light source 121 and the second light source 122 are adjusted so that the detected intensity in the light receiving element 13A when forming the first light intensity distribution LID1 by the first light source module 126 in the light source section 12A and the detected intensity in the receiving element 13A when forming the second light intensity distribution LID2 by the second light source module 127 become equal to each other.

More specifically, firstly, the light source drive section 51 of the controlling IC 70A shown in FIG. 9 performs the first lighting operation of lighting the first light source 121 to thereby form the first light intensity distribution LID1, and then performs the second lighting operation of lighting the second light source 122 to thereby form the second light intensity distribution LID2. On this occasion, the first light intensity distribution LID1 and the second light intensity distribution LID2 have directions of intensity variation opposite to each other but have the same intensity levels. Subsequently, the light reception amount measurement section 73 and the adjustment amount calculation section 74 of the position detection section 50 shown in FIG. 9 compare the light reception intensity INTa of the light receiving element 13A in the first lighting operation and the light reception intensity INTb of the light receiving element 13A in the second lighting operation with each other, and then adjust drive current values supplied to the first light source 121 and the second light source 122 so that the light reception intensity INTa of the light receiving element 13A in the first lighting operation and the light reception intensity INTb of the light receiving element 13A in the second lighting operation become equal to each other if the light reception intensities INTa, INTb are different from each other. Then, when performing the first lighting operation and the second lighting operation again, if the light reception intensity INTa of the light receiving element 13A in the first lighting operation and the light reception intensity INTb of the light receiving element 13A in the second lighting operation are equal to each other, the first coordinate data acquisition section 551 shown in FIG. 9 obtains the angle θ (the angle θ1) of the direction in which the target object Ob is located based on the ratio between the drive currents respectively to the first light source 121 and the second light source 122 after performing the adjustment described above, or the ratio between the adjustment amounts of the respective drive currents.

By performing such an operation also in the light source section 12B of the light emitting/receiving unit 15B, it is possible for the first coordinate data acquisition section 551 shown in FIG. 9 to obtain the angle θ (an angle θ2) of the direction in which the target object Ob is located based on the center PE of the second light source section 12B as shown in FIGS. 10B and 11. Therefore, the first coordinate data acquisition section 551 obtains an intersection between a line with the angle θ (the angle θ1) obtained by the light emitting/receiving unit 15A and a line with the angle θ (the angle θ2) obtained by the light emitting/receiving unit 15B, and then takes a position corresponding to the intersection as the coordinate data (the X-Y coordinate data) of the target object Ob in the detection target space 10R.

Further, by performing the similar operation in the light emitting/receiving unit 15C and the light emitting/receiving unit 15D of the second pair of units 11cd, it is possible for the second coordinate data acquisition section 552 to detect the coordinate data (the X-Y coordinate data) of the target object Ob in the detection target space 10R.

Here, the detection target space 10R is divided into the detection target space 10Rab where the position detection by the first pair of units 11ab is performed and the detection target space 10Rcd where the position detection by the second pair of units 11cd is performed. Therefore, if the target object Ob is located in the detection target space 10Rab, the light reception intensity in the second pair of units 11cd is zero or in a significantly low level, and if the target object Ob is located in the detection target space 10Rcd, the light reception intensity in the first pair of units 11ab is zero or in a significantly low level. Therefore, it is possible for the coordinate data determination section 553 to determine which one of the detection target space 10Rab and the detection target space 10Rcd the target object Ob is located based on the light reception intensity in the first pair of units 11ab and the light reception intensity in the second pair of units 11cd, and at the same time, to detect the coordinate data of the target object Ob.

Further, if the target objects θb are located respectively in the detection target space 10Rab and the detection target space 10Rcd, both of the light reception intensity in the first pair of units 11ab and the light reception intensity in the second pair of units 11cd are high. Therefore, the coordinate data determination section 553 obtains the coordinate data of the target object Ob located in the detection target space 10Rab based on the detection result in the first pair of units 11ab, and obtains the coordinate data of the target object Ob located in the detection target space 10Rcd based on the detection result in the second pair of units 11cd.

Major Advantages of Present Embodiment

As explained hereinabove, in the optical position detection device 10 according to the present embodiment, the detection light L2 is radially emitted from the respective light source sections 12A through 12D of the light emitting/receiving units 15A through 15D along the imaginary plane, and the position detection is performed using such detection light L2. Therefore, it is possible to emit the detection light L2 with relatively high intensity throughout a wide range. Further, in the first pair of units 11ab composed of the light emitting/receiving unit 15A (the third light emitting/receiving unit) and the light emitting/receiving unit 15B (the first light emitting/receiving unit), the emission angular ranges (the detection light emission angular ranges θa, θb) of the detection light L2 emitted by the light source sections (the light source section 12A and the light source section 12B) are overlapped with each other. Therefore, by receiving the detection light L2 reflected by the target object Ob and then detecting the angular direction in which the target object Ob is located in each of the two light emitting/receiving units (the light emitting/receiving unit 15A and the light emitting/receiving unit 15B), the position of the target object Ob can be detected. Here, the optical position detection device 10 is provided with another pair of units, and in each of the light emitting/receiving unit 15C (the second light emitting/receiving unit) and the light emitting/receiving unit 15D (the fourth light emitting/receiving unit) of the other pair of units, namely the second pair of units 11cd, the detection light L2 reflected by the target object Ob is received, and then the angular direction in which the target object Ob is located is detected to thereby detect the position of the target object Ob. Therefore, only by making the detection target space 10Rab formed by the first pair of units 11ab and the detection target space 10Rcd formed by the second pair of units 11cd contiguous to each other, a broad detection target space 10R can be realized. Conversely, the broad detection target space 10R can be divided into the detection target space 10Rab formed by the first pair of units 11ab and the detection target space 10Rcd formed by the second pair of units 11cd. Therefore, even in the case in which the detection target space 10R is broad, the entire detection target space 10R can be irradiated with the detection light L2 with sufficient intensity. Further, since the detection target space 10R is divided, and each of the light receiving elements (the light receiving elements 13A through 13D) is only required to handle a relatively narrow angular range, it is enough for the light receiving element to receive the detection light entering in the angular range with relatively high sensitivity. Therefore, even in the case of the broad detection target space 10R, the position detection accuracy of the target object Ob is kept high. Further, the light receiving element 13B (the first light receiving element) of the light emitting/receiving unit 15B (the first light emitting/receiving unit) and the light receiving element 13C (the second light receiving element) of the light emitting/receiving unit 15C (the second light emitting/receiving unit) are disposed so as to overlap each other when viewed from the Z-axis direction at a position shifted in the Z-axis direction. Therefore, even if the light receiving elements 13B, 13C are disposed at positions close to each other, the light reception angular range of the light receiving element 13B and the light reception angular range of the light receiving element 13C can partially be overlapped with each other when viewed from the Z-axis direction, and therefore, no blind area occurs in the light reception angular range. Therefore, even in the case of broadening the detection target space 10R, the position of the target object Ob can optically be detected with high accuracy throughout the entire detection target space 10R.

Further, the light emitting/receiving unit 15A and the light emitting/receiving unit 15D are distant in the X-axis direction, and the light emitting/receiving unit 15B and the light emitting/receiving unit 15C are disposed at the positions overlapping each other in the Z-axis direction. Further, the light emitting/receiving units 15A, 15D are located on the outer side of the light emitting/receiving units 15B, 15C in the X-axis direction. Therefore, even in the case of disposing the four light emitting/receiving units 15A through 15D at positions relatively close to each other, it is difficult for the detection light L2 emitted from the light emitting/receiving units 15A, 15D toward the detection target space 10R to be blocked by the light emitting/receiving units 15B, 15C. Therefore, even if the four light emitting/receiving units 15A through 15D are disposed in roughly central position of the detection target space 10R in the longitudinal direction thereof, no blind area occurs. Further, the angle formed between the angular direction (the normal direction with respect to the light receiving surface) in which the light reception sensitivity peak of each of the light receiving elements 13A through 13D is located and the perpendicular bisector L11 is set to be equal to or smaller than 60°. Therefore, even in the case in which the perpendicular bisector L11 is set to a boundary between the detection target space 10Rab and the detection target space 10Rcd, it is sufficient for the light receiving elements 13A through 13D to receive the detection light L2 entering in the angular range with relatively high sensitivity within the half-value angle, and therefore, the position detection accuracy of the target object Ob is high.

Further, the angle formed between the angular direction in which the light reception sensitivity peak of the light receiving element 13A is located and the perpendicular bisector L11 is equal to or smaller than the angle formed between the angular direction in which the light reception sensitivity peak of the light receiving element 13B is located and the perpendicular bisector L11. Further, the angle formed between the angular direction in which the light reception sensitivity peak of the light receiving element 13D is located and the perpendicular bisector L11 is equal to or smaller than the angle formed between the angular direction in which the light reception sensitivity peak of the light receiving element 13C is located and the perpendicular bisector L11. Therefore, even in the case in which the detection target angular range covered by the light emitting/receiving units 15A, 15D is broader than the detection target angular range covered by the light emitting/receiving units 15B, 15C, it is sufficient for the light receiving elements 13A, 13D to receive the detection light L2 entering in the angular range with relatively high sensitivity within the half-value angle, and therefore, the position detection accuracy of the target object Ob is high.

Further, the light source sections 12A through 12D are each provided with the light guide LG extending to form the circular arc shape, and the light source 120 for making the detection light L2 enter the inside of the light guide LG from the end portion of the light guide LG. Therefore, since the emission intensity of the detection light L2 varies continuously along the emission angular range from one side thereof toward the other side thereof, the high detection accuracy can be realized throughout the entire detection target space 10R. Further, the detection light L2 is infrared light, and is therefore invisible. Therefore, there is an advantage that the detection light L2 does not hinder viewing of an image even in the case in which the image is displayed on the visual plane 41.

Modified Example of First Embodiment

Figure 12:
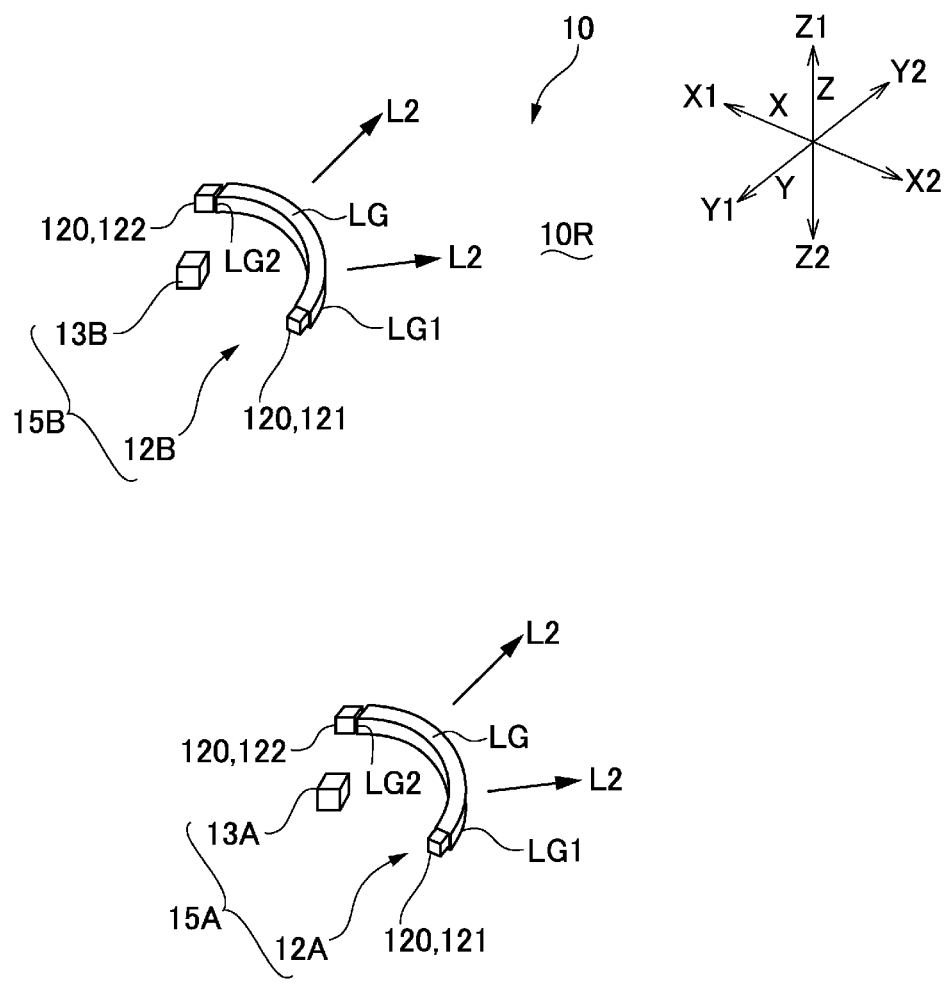
FIG. 12 is an explanatory diagram showing a configuration of the optical position detection device according to a modified example of the first embodiment of the invention.

FIG. 12 is an explanatory diagram showing a configuration of the optical position detection device 10 according to a modified example of the first embodiment of the invention. It should be noted that since the basic configuration of the present example is substantially the same as in the first embodiment, common parts are shown in the drawing with the same reference symbols and the explanation therefor will be omitted.

Although in the first embodiment each of the light source sections (the light source section 12A, the light source section 12B, the light source section 12C, and the light source section 12D) of the respective light emitting/receiving units has the configuration of including the first light source module 126 and the second light source module 127 disposed so as to be stacked in the Z-axis direction, each of the light source section 12A, the light source section 12B, the light source section 12C, and the light source section 12D is composed of a single light source module in the present modified example. More specifically, as shown in FIG. 12, the light source section 12A of the light emitting/receiving unit 15A has the light source 120 (the first light source 121 and the second light source 122) disposed respectively on the one end portion LG1 of the single light guide LG and the other end portion LG2 thereof. Further, the light source section 12B of the light emitting/receiving unit 15B also has the light source 120 (the first light source 121 and the second light source 122) disposed respectively on the one end portion LG1 of the single light guide LG and the other end portion LG2 thereof. It should be noted that although not shown in the drawing, the light emitting/receiving units 15C, 15D have the same configurations as those of the light emitting/receiving units 15A, 15B. The other part of the configuration is the same as in the case with the first embodiment.

According also to such a configuration, when the first light source 121 lights in the first lighting operation, the first light intensity distribution LID1 shown in FIGS. 8A and 10A can be formed, and when the second light source 122 lights in the second lighting operation, the second light intensity distribution LID2 shown in FIGS. 8B and 10A can be formed. It should be noted that in the case of the present example, if the light receiving elements 13A through 13D are disposed at the radiation centers of the light source sections 12A through 12D, the entrance of the reflected light L3 to the light receiving elements 13A through 13D is hindered by the light source sections 12A through 12D, respectively. Therefore, the light receiving elements 13A through 13D should be disposed at positions overlapping the radiation centers of the light source sections 12A through 12D in the Z-axis direction, respectively.

Second Embodiment

Figure 13:
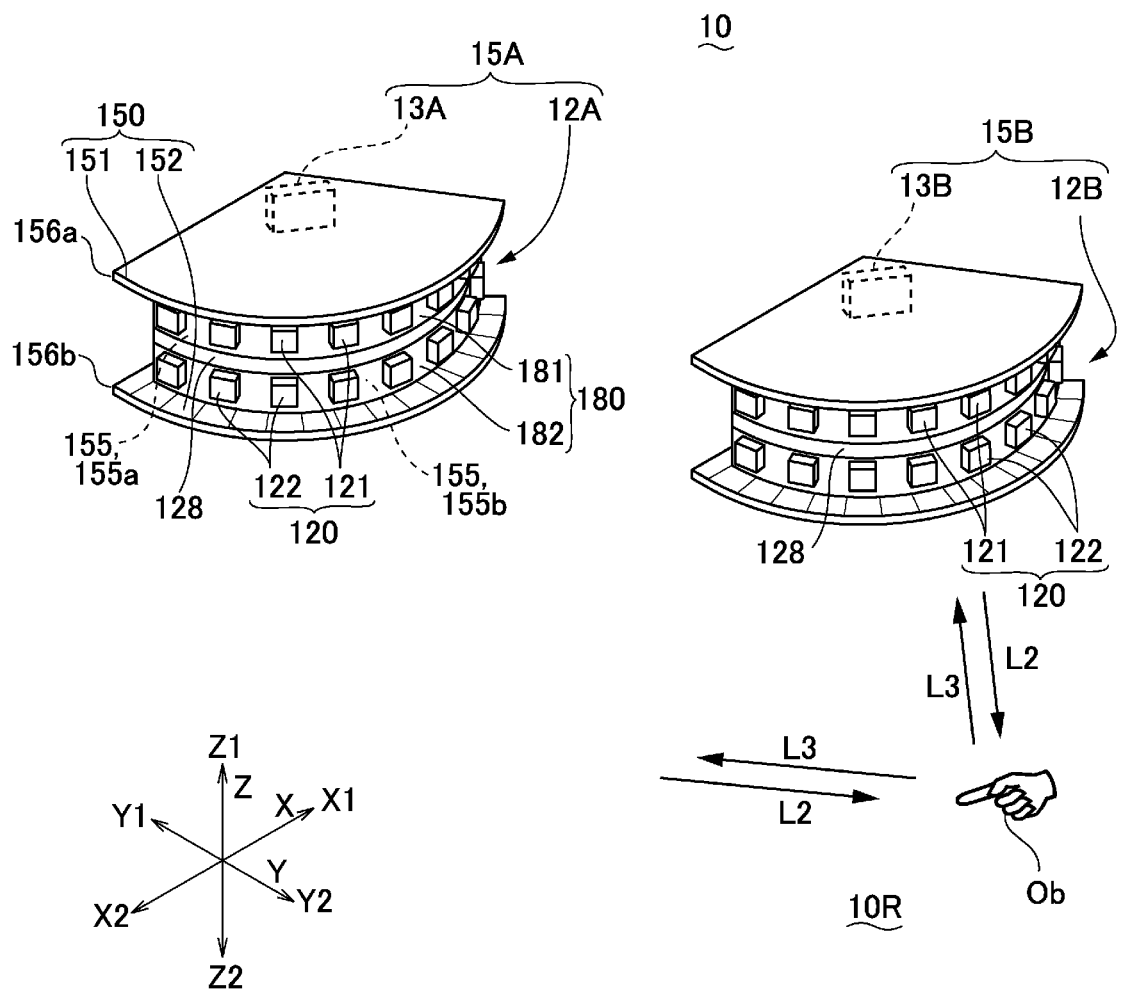
FIG. 13 is an explanatory diagram schematically showing a principal part of the optical position detection device according to a second embodiment of the invention.
Figure 14A:
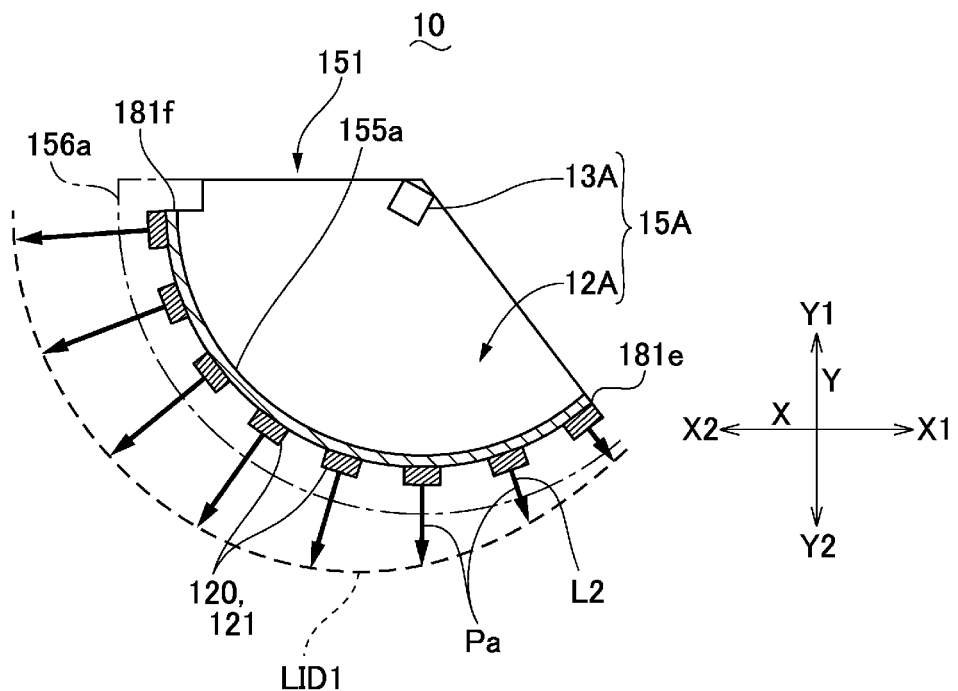
FIGS. 14A and 14B are explanatory diagrams of the light source section of the optical position detection device according to the second embodiment of the invention.
Figure 14B:
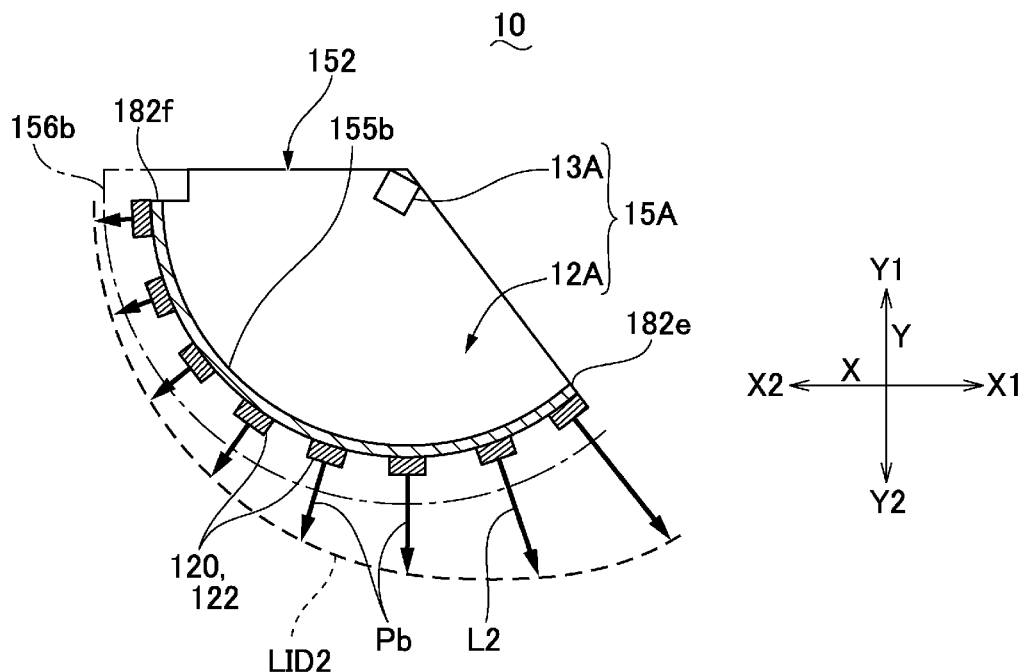

FIG. 13 is an explanatory diagram schematically showing a principal part of the optical position detection device 10 according to a second embodiment of the invention. FIGS. 14A and 14B are explanatory diagrams of the light source section of the optical position detection device 10 according to the second embodiment of the invention. It should be noted that since the basic configuration of the present embodiment is substantially the same as in the first embodiment, common parts are shown in the drawing with the same reference symbols and the explanation therefor will be omitted.

Although the light guide LG is used in the light source section in the first embodiment, the X-Y coordinate of the target object Ob is detected using substantially the same principle as in the first embodiment without using the light guide in the present embodiment.

More specifically, as shown in FIG. 13, the light source section 12A of the light emitting/receiving unit 15A is provided with a plurality of light sources 120 (a plurality of first light sources 121 and a plurality of second light sources 122), a flexible substrate 180 having a strip shape having the plurality of light sources 120 mounted thereon in the longitudinal direction at predetermined intervals, and the light source support member 150 provided with a convex curved surface 155 extending in the longitudinal direction (a circumferential direction) having a curved shape. In the present embodiment, the convex curved surface 155 has a shape curved in the longitudinal direction (the circumferential direction) thereof to have a semicircular arc shape. In the present embodiment, there are used a first flexible substrate 181 having a strip shape, and a second flexible substrate 182 having a strip shape arranged in parallel to the first flexible substrate 181 in a width direction (the Z-axis direction) as the flexible substrate 180. On the first flexible substrate 181, there is mounted the plurality of first light sources 121 as the plurality of light sources 120 in the longitudinal direction thereof, and on the second flexible substrate 182, there is mounted the plurality of second light sources 122 as the plurality of light sources 120 in the longitudinal direction thereof. An LED is used as each of the light sources 120.

The light source support member 150 has a structure having the first light source support member 151 and the second light source support member 152 stacked in the Z-axis direction, and the first light source support member 151 and the second light source support member 152 have respective configurations symmetrical to each other in the Z-axis direction. The first light source support member 151 is provided with a convex curved surface 155a having a semicircular arc shape constituting an upper half portion of the convex curved surface 155, and the brim section 156a having a semicircular shape projecting from the convex curved surface 155a in an end portion of the convex curved surface 155a on the opposite side to the side where the second light source support member 152 is located, and the first flexible substrate 181 is disposed so as to be stacked on the convex curved surface 155a. The second light source support member 152 is provided with a convex curved surface 155b having a semicircular arc shape constituting a lower half portion of the convex curved surface 155, and the brim section 156b having a semicircular shape projecting from the convex curved surface 155b in an end portion of the convex curved surface 155b on the opposite side to the side where the first light source support member 151 is located, and the second flexible substrate 182 is disposed so as to be stacked on the convex curved surface 155b. A part sandwiched in the Z-axis direction between the first flexible substrate 181 and the second flexible substrate 182 forms the light guide section 128 having a light transmissive property, and the light receiving element 13A provided with a photodiode is arranged at the back of the light guide section 128. Further, the light source section 12B of the light emitting/receiving unit 15B is also provided with the plurality of light sources 120 mounted on the flexible substrate 180 similarly to the light source section 12A. It should be noted that although not shown in the drawing, the light emitting/receiving units 15C, 15D have the same configurations as those of the light emitting/receiving units 15A, 15B. The other part of the configuration is the same as in the case with the first embodiment.

In the optical position detection device 10 configured as described above, in order for detecting the position of the target object Ob in the detection target space 10R, the plurality of first light sources 121 mounted on the first flexible substrate 181 and the plurality of second light sources 122 mounted on the second flexible substrate 182 are lit at respective timings different from each other. On this occasion, in the first lighting operation of lighting all of the first light sources 121 and putting off all of the second light sources 122, the emission intensities of the first light sources 121 are set so as to decrease in a direction from the side where one end portion 181f of the first flexible substrate 181 in the longitudinal direction is located toward the side where the other end portion 181e is located as shown in FIG. 14A where the level of the emission intensity is indicated by arrows Pa. Therefore, in the first light intensity distribution LID1 of the detection light L2 emitted to the detection target space 10R, the light intensity is high in an angular direction in which the one end portion 181f in the longitudinal direction of the first flexible substrate 181 is located, and is then continuously decreased toward an angular direction in which the other end portion 181e is located. In contrast, in the second lighting operation of lighting all of the second light sources 122 and putting off all of the first light sources 121, the emission intensities of the second light sources 122 are set so as to increase in a direction from the side where one end portion 182f of the second flexible substrate 182 in the longitudinal direction is located toward the side where the other end portion 182e is located as shown in FIG. 14B where the level of the emission intensity is indicated by arrows Pb. Therefore, in the second light intensity distribution LID2 of the detection light L2 emitted to the detection target space 10R, the light intensity is high in an angular direction in which the other end portion 182e in the longitudinal direction of the second flexible substrate 182 is located, and is then continuously decreased toward an angular direction in which the one end portion 182f is located. Therefore, by performing the first lighting operation and the second lighting operation in each of the light source section 12A of the light emitting/receiving unit 15A and the light source section 12B of the light emitting/receiving unit 15B, the position (the X-Y coordinate) of the target object Ob can be detected using substantially the same principle as in the first embodiment. Further, by performing the first lighting operation and the second lighting operation in each of the light source section 12C of the light emitting/receiving unit 15C and the light source section 12D of the light emitting/receiving unit 15D, the position (the X-Y coordinate) of the target object Ob can be detected using substantially the same principle as in the first embodiment. On this occasion, it is possible to detect the angular position of the target object Ob based on the sum of the drive currents supplied to the plurality of first light sources 121 and the sum of the drive currents supplied to the plurality of second light sources 122. Further, in order for varying the emission intensity of the plurality of light sources 120, it is possible to vary the drive current between the light sources 120 using resistor elements or the like. According to the second embodiment described above, there is obtained an advantage that the detection light can be emitted to the position distant from the light source section with sufficient intensity.

Modified Example of Second Embodiment

Figure 15:
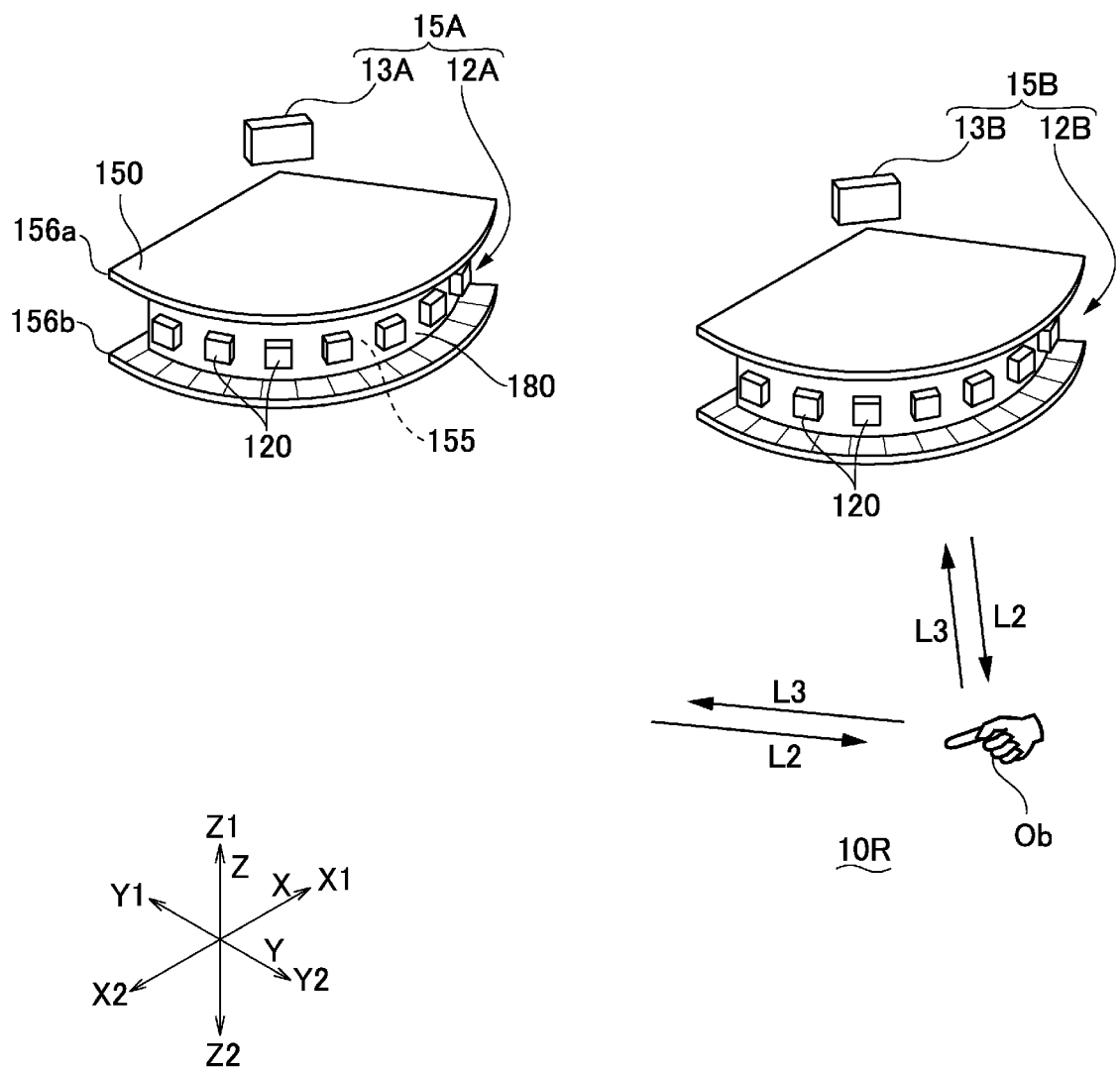
FIG. 15 is an explanatory diagram showing a configuration of the optical position detection device according to a modified example of the second embodiment of the invention.

FIG. 15 is an explanatory diagram showing a configuration of the optical position detection device 10 according to a modified example of the second embodiment of the invention. It should be noted that since the basic configuration of the present example is substantially the same as in the second embodiment, common parts are shown in the drawing with the same reference symbols and the explanation therefor will be omitted.

Although in the second embodiment the first light sources 121 are lit in the first lighting operation, and the second light sources 122 are lit in the second lighting operation, in the present example, in either of the light source section 12A of the light emitting/receiving unit 15A and the light source section 12B of the light emitting/receiving unit 15B, a single series of light sources 120 are used alone as shown in FIG. 15. It should be noted that although not shown in the drawing, the light emitting/receiving units 15C, 15D have the same configurations as those of the light emitting/receiving units 15A, 15B. The other part of the configuration is the same as in the case with the second embodiment.

According also to such a configuration as described above, by changing the drive currents supplied to the light sources 120 between the first lighting operation and the second lighting operation, the position (the X-Y coordinate) of the target object Ob can be detected using substantially the same principle as in the first embodiment. Specifically, in the first lighting operation, the emission intensities of the respective light sources 120 are set so as to decrease from the side where one end portion of the flexible substrate 180 in the longitudinal direction is located toward the side where the other end portion is located as shown in FIG. 14A in which the level of the emission intensity is indicated by the arrows Pa. Therefore, in the first light intensity distribution LID1 of the detection light L2 emitted to the detection target space 10R, the light intensity is high in an angular direction in which the one end portion in the longitudinal direction of the flexible substrate 180 is located, and is then continuously decreased toward an angular direction in which the other end portion is located. Further, in the second lighting operation, the emission intensities of the respective light sources 120 are set so as to decrease from the side where the other end portion of the flexible substrate 180 in the longitudinal direction is located toward the side where the one end portion is located as shown in FIG. 14B in which the level of the emission intensity is indicated by the arrows Pb. Therefore, in the second light intensity distribution LID2 of the detection light L2 emitted to the detection target space 10R, the light intensity is high in the angular direction in which the other end portion in the longitudinal direction of the flexible substrate 180 is located, and is then continuously decreased toward the angular direction in which the one end portion is located.

Therefore, by performing the first lighting operation and the second lighting operation in each of the light source section 12A and the light source section 12B, the position (the X-Y coordinate) of the target object Ob can be detected using substantially the same principle as in the first embodiment. On this occasion, it is possible to detect the angular position of the target object Ob based on the sum of the drive currents to the light sources 120 in the first lighting operation and the sum of the drive currents to the light sources 120 in the second lighting operation. It should be noted that in the case of the present example, if the light receiving elements 13A through 13D are disposed at the radiation centers of the light source sections 12A through 12D, the entrance of the reflected light L3 to the light receiving elements 13A through 13D is hindered by the light source sections 12A through 12D, respectively. Therefore, the light receiving elements 13A through 13D should be disposed at positions overlapping the radiation centers of the light source sections 12A through 12D in the Z-axis direction, respectively.

Other Embodiments

Figure 16:
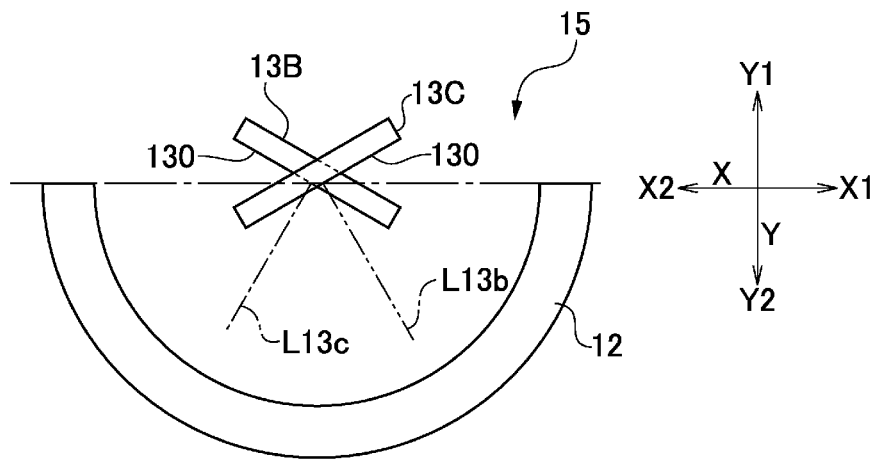
FIG. 16 is an explanatory diagram of a light emitting/receiving unit used in the optical position detection device according to another embodiment of the invention.

FIG. 16 is an explanatory diagram of a light emitting/receiving unit used in the optical position detection device 10 according to another embodiment of the invention. Although in the embodiments described above the light emitting/receiving units 15B, 15C are constituted by providing the light source sections 12B, 12C respectively to the light receiving elements 13B, 13C, it is also possible to constitute the light emitting/receiving unit 15 by providing a common light source section 12 to the light receiving element 13B (the first light receiving element) and the light receiving element 13C (the second light receiving element) as shown in FIG. 16.

Configuration of Position Detection System

First Specific Example of Position Detection System 1

Figure 17:
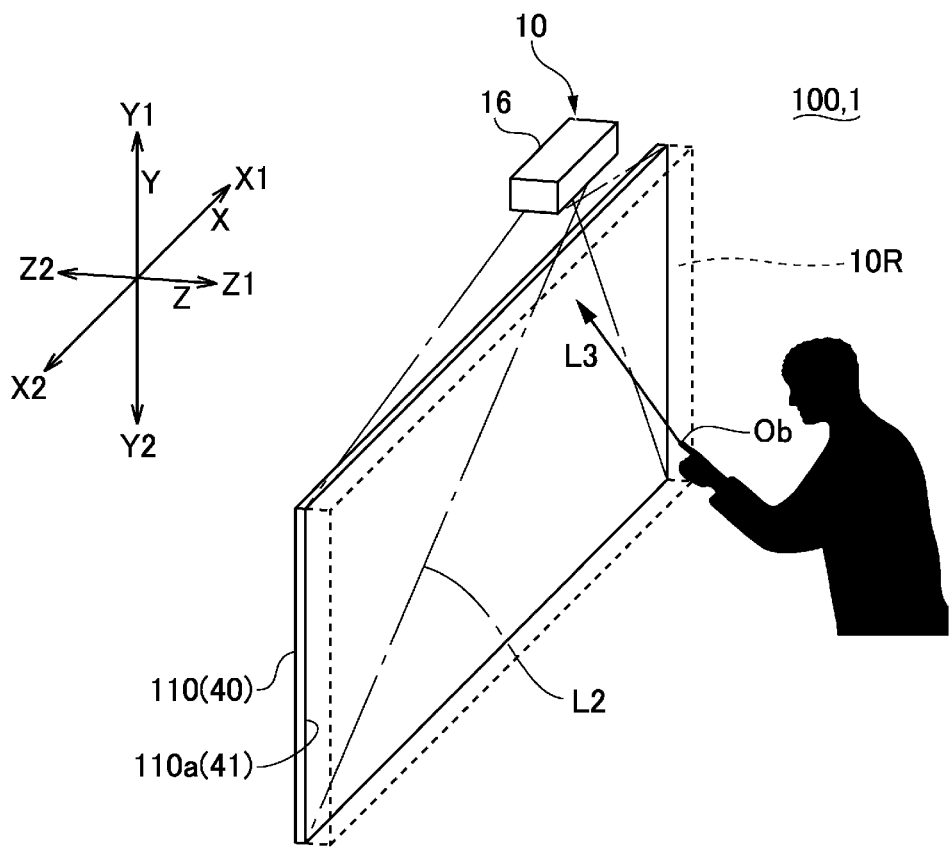
FIG. 17 is an explanatory diagram of a first specific example (a display system with an input function) of a position detection system to which the embodiment of the invention is applied.

FIG. 17 is an explanatory diagram of a first specific example (a display system with an input function) of the position detection system 1 to which the embodiment of the invention is applied. It should be noted that in the position detection system 1 according to the present embodiment, since the configuration of the optical position detection device 10 is substantially the same as the configuration explained with reference to FIGS. 1, 2A, 2B, 3, 4A, 4B, 5A, 5B, 6, 7, 8A, 8B, 9, 10A 10B, 11, 12, 13, 14A, 14B, 15, and 16, the constituents common to the both configurations are denoted with the same reference symbols, and the explanation therefor will be omitted.

As shown in FIG. 17, by using a display device 110 as the visual plane forming member 40, and providing the optical position detection device 10 explained with reference to FIGS. 1, 2A, 2B, 3, 4A, 4B, 5A, 5B, 6, 7, 8A, 8B, 9, 10A 10B, 11, 12, 13, 14A, 14B, 15, and 16 to the display device 110, the position detection system 1 explained with reference to FIGS. 1, 2A, 2B, 3, 4A, 4B, 5A, 5B, 6, 7, 8A, 8B, 9, 10A 10B, 11, 12, 13, 14A, 14B, 15, and 16 can be used as a display system 100 with an input function such as a blackboard or a digital signage. Here, the display device 110 is a direct-view display device or a rear-projection display device using the visual plane forming member 40 as a screen.

In such a display system 100 with the input function, the optical position detection device 10 emits the detection light L2 along a display surface 110*a* (the visual plane 41), and at the same time, detects the detection light L2 (the reflected light L3) reflected by the target object Ob. Therefore, if the target object Ob such as a fingertip is moved closer to a part of an image displayed by the display device 110, the position of the target object Ob can be detected, and therefore, the position of the target object Ob can be used as input information such as a switching instruction of the image.

Second Specific Example of Position Detection System 1

Figure 18:
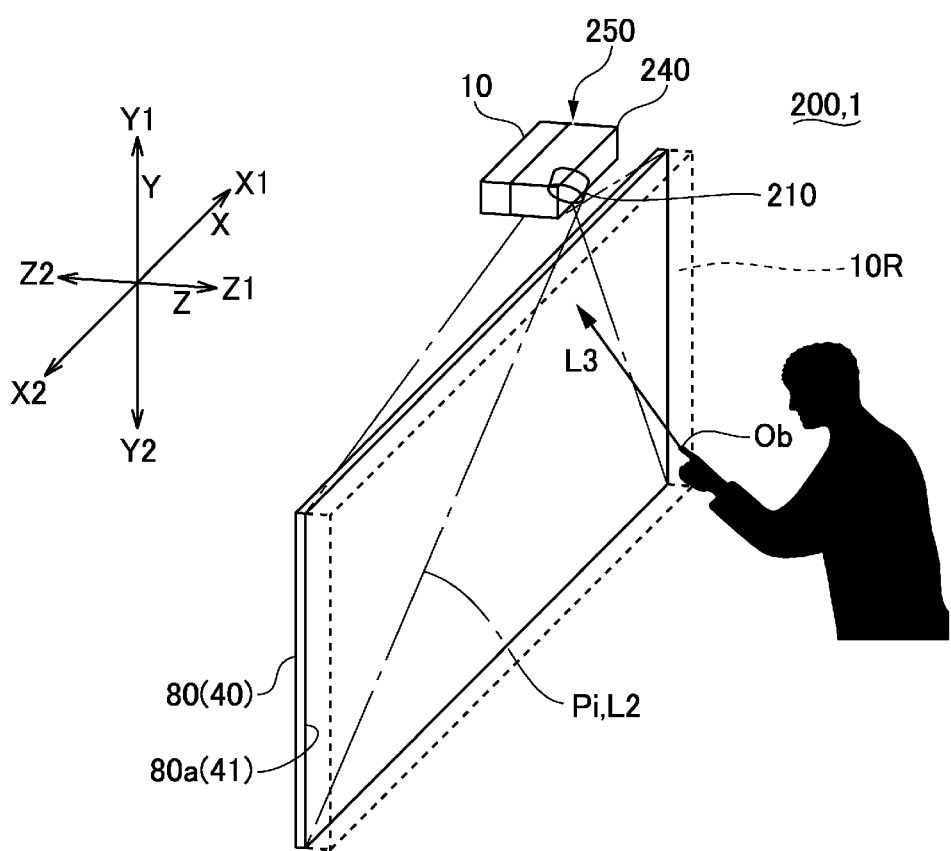
FIG. 18 is an explanatory diagram of a second specific example (a display system with an input function or a projection display system with an input function) of a position detection system to which the embodiment of the invention is applied.

An example using a screen as the visual plane forming member 40 to thereby constitute a projection display system with a position detection function will be explained with reference to FIG. 18. FIG. 18 is an explanatory diagram of a second specific example (a display system with an input function or a projection display system with an input function) of the position detection system 1 to which the embodiment of the invention is applied. It should be noted that in the projection display system with an input function according to the present embodiment, since the configuration of the optical position detection device 10 is substantially the same as the configuration explained with reference to FIGS. 1, 2A, 2B, 3, 4A, 4B, 5A, 5B, 6, 7, 8A, 8B, 9, 10A 10B, 11, 12, 13, 14A, 14B, 15, and 16, the constituents common to the both configurations are denoted with the same reference symbols, and the explanation therefor will be omitted.

In a projection display system 200 with an input function (the display system with the input function) shown in FIG. 18, an image is projected on a screen 80 (the visual plane forming member 40) from an image projection device 250 (an image reproduction device) called a liquid crystal projector or a digital micromirror Device™. In such a projection display system 200 with the input function, the image projection device 250 projects an image display light Pi in an enlarged manner from a projection lens system 210 provided to a housing 240 toward the screen 80. Here, the image projection device 250 projects the image display light Pi toward the screen 80 in a direction slightly tilted with respect to the Y-axis direction. Therefore, the visual plane 41 where information is viewed is formed by a screen surface 80*a* on which the image is projected in the screen 80.

In such a projection display system 200 with the input function, the optical position detection device 10 is attached to the image projection device 250, and is formed integrally therewith. Therefore, the optical position detection device 10 emits the detection light L2 along the screen surface 80a from a place different from the projection lens system 210, and at the same time, detects the reflected light L3 reflected by the target object Ob. Therefore, if the target object Ob such as a fingertip is moved closer to a part of the image projected on the screen 80, the position of the target object Ob can be detected, and therefore, the position of the target object Ob can be used as the input information such as a switching instruction of the image.

It should be noted that by integrating the optical position detection device 10 and the screen 80 with each other, a screen device with the input function can be formed.

Other Specific Examples of Position Detection System 1

In the invention, a configuration of using a light transmissive member covering an exhibit as the visual plane forming member can be adopted, and in this case, the visual plane is the side in the light transmissive member opposite to the side on which the exhibit is disposed and the side from which the exhibit is viewed. According to such a configuration, it can be configured as a window system with the input function or the like.

Further, the configuration of using a substrate for supporting a moving gaming medium as the visual plane forming member can be adopted, and in this case, the visual plane is the side of the substrate from which the relative position between the substrate and the gaming medium can be viewed. According to such a configuration, it is possible to configure an amusement equipment such as a pinball machine or a coin game as an amusement system with an input function or the like. The entire disclosure of Japanese Patent Application No. 2011-156432, filed Jul. 15, 2011 is expressly incorporated by reference herein.

What is claimed is:

1. An optical position detection device comprising:
   a light source section adapted to radially emit detection light along an imaginary plane defined by a first direction and a second direction perpendicular to each other;
   first and second light receiving elements that are disposed at a position overlapping a radiation center of the detection light when viewed from a third direction perpendicular to the imaginary plane, and that are adapted to receive the detection light reflected by a target object, the first and second light receiving elements being located to overlap with each other in the third direction;
   third and fourth light receiving elements that are adapted to receive the detection light reflected by the target object, the first and second light receiving elements being located at a position, which is on a perpendicular bisector with respect to a connection line connecting between the third and fourth light receiving elements, with a gap from the connection line in the second direction, and
   a position detection section adapted to detect a position of the target object based on a light reception intensity in each of the first through fourth light receiving elements, wherein
   the first through fourth light receiving elements have first through fourth normal directions with respect to first through fourth light receiving surfaces, respectively,
   the first normal direction is different from the second normal direction,
   a first angle between the first normal direction and the perpendicular bisector is equal to or larger than a second angle between the third normal direction and the perpendicular bisector, and
   a third angle between the second normal direction and the perpendicular bisector is equal to or larger than a fourth angle between the fourth normal direction and the perpendicular bisector.

2. The optical position detection device according to claim 1, wherein
   the light source section includes
      a first light source section having an angular range, which at least partially overlaps with a light reception angular range of the first light receiving element, as a detection light emission angular range, and
      a second light source section having an angular range, which at least partially overlaps with a light reception angular range of the second light receiving element, as the detection light emission angular range and
      a radiation center of the detection light emitted from the first light source section and a radiation center of the detection light emitted from the second light source section overlap with each other when viewed from the third direction.

3. The optical position detection device according to claim 2, wherein
   the first light source section and the second light source section are disposed at respective positions different in the third direction from each other.

4. The optical position detection device according to claim 3, wherein
   the first light receiving element and the first light source section constitute a first light emitting/receiving unit, and
   the second light receiving element and the second light source section constitute a second light emitting/receiving unit.

5. The optical position detection device according to claim 4, wherein
   the light source section further includes
      a third light source section adapted to radially emit the detection light to an angular range at least partially overlapping with the detection light emission angular range of the first light source section, and
      a fourth light source section adapted to radially emit the detection light to an angular range at least partially overlapping with the detection light emission angular range of the second light source section,
   the third light receiving element has an angular range at least partially overlapping with a detection light emission angular range of the third light source section as a light reception angular range, and overlapping with a radiation center of the detection light emitted from the third light source section when viewed from the third direction, and
   the fourth light receiving element has an angular range at least partially overlapping with a detection light emission angular range of the fourth light source section as a light reception angular range, and overlapping with a radiation center of the detection light emitted from the fourth light source section when viewed from the third direction,
   the third light receiving element and the third light source section constitute a third light emitting/receiving unit at a position distant from the first light emitting/receiving unit on one side of the second direction, the fourth light receiving element and the fourth light source section constitute a fourth light emitting/receiving unit at a position distant from the third light emitting/receiving unit on one side of the first direction, and the first light emitting/receiving unit and the second light emitting/receiving unit are disposed at a position, which is on the perpendicular bisector with a gap from the connection line in the second direction.

6. The optical position detection device according to claim 1, wherein the first through fourth angles are equal to or smaller than 60°.

7. A display system with an input function comprising:

a display device provided with a display surface where an image is displayed; and an optical position detection device adapted to optically detect a position of a target object in a direction along the display surface, wherein the image is switched based on a result of the detection of the position of the target object in the optical position detection device, the optical position detection device includes a light source section adapted to radially emit detection light along an imaginary plane defined by a first direction and a second direction perpendicular to each other, first and second light receiving elements that are disposed at a position overlapping a radiation center of the detection light when viewed from a third direction perpendicular to the imaginary plane, and that are adapted to receive the detection light reflected by the target object, the first and second light receiving elements being located to overlap with each other in the third direction, third and fourth light receiving elements that are adapted to receive the detection light reflected by the target object, the first and second light receiving elements being located at a position, which is on a perpendicular bisector with respect to a connection line connecting between the third and fourth light receiving elements, with a gap from the connection line in the second direction, and a position detection section adapted to detect a position of the target object based on a light reception intensity in each of the first through fourth light receiving elements, the first through fourth light receiving elements have first through fourth normal directions with respect to first through fourth light receiving surfaces, respectively, the first normal direction is different from the second normal direction, a first angle between the first normal direction and the perpendicular bisector is equal to or larger than a second angle between the third normal direction and the perpendicular bisector, and a third angle between the second normal direction and the perpendicular bisector is equal to or larger than a fourth angle between the fourth normal direction and the perpendicular bisector.

8. A display system with an input function comprising:

an image projection device adapted to project an image; and an optical position detection device adapted to optically detect a position of a target object in a direction intersecting with a projection direction of the image, wherein the image is switched based on a result of the detection of the position of the target object in the optical position detection device, the optical position detection device includes a light source section adapted to radially emit detection light along an imaginary plane defined by a first direction and a second direction perpendicular to each other, first and second light receiving elements that are disposed at a position overlapping a radiation center of the detection light when viewed from a third direction perpendicular to the imaginary plane, and that are adapted to receive the detection light reflected by the target object, the first and second light receiving elements being located to overlap with each other in the third direction, third and fourth light receiving elements that are adapted to receive the detection light reflected by the target object, the first and second light receiving elements being located at a position, which is on a perpendicular bisector with respect to a connection line connecting between the third and fourth light receiving elements, with a gap from the connection line in the second direction, and a position detection section adapted to detect the position of the target object based on a light reception intensity in each of the first through fourth light receiving elements, the first through fourth light receiving elements have first through fourth normal directions with respect to first through fourth light receiving surfaces, respectively, the first normal direction is different from the second normal direction, a first angle between the first normal direction and the perpendicular bisector is equal to or larger than a second angle between the third normal direction and the perpendicular bisector, and a third angle between the second normal direction and the perpendicular bisector is equal to or larger than a fourth angle between the fourth normal direction and the perpendicular bisector.

* * * * *